(12) United States Patent
Fishkin et al.

(10) Patent No.: US 9,685,190 B1
(45) Date of Patent: Jun. 20, 2017

(54) CONTENT SHARING

(75) Inventors: Kenneth P. Fishkin, Seattle, WA (US); Stephen F. Yegge, Kirkland, WA (US); Peter M. Wilson, Kirkland, WA (US)

(73) Assignee: Google Inc., Mountain View, CA (US)

( * ) Notice: Subject to any disclaimer, the term of this patent is extended or adjusted under 35 U.S.C. 154(b) by 1770 days.

(21) Appl. No.: 11/424,421

(22) Filed: Jun. 15, 2006

(51) Int. Cl.
| | |
|---|---|
| G10L 15/00 | (2013.01) |
| G10L 25/54 | (2013.01) |
| G10L 15/26 | (2006.01) |
| G11B 20/10 | (2006.01) |
| G10H 1/36 | (2006.01) |

(52) U.S. Cl.
CPC ....... G11B 20/10527 (2013.01); G10H 1/366 (2013.01)

(58) Field of Classification Search
CPC .......................... G10H 1/366; G11B 20/10527
USPC .................................................. 709/231, 203
See application file for complete search history.

(56) References Cited

U.S. PATENT DOCUMENTS

| | | | | |
|---|---|---|---|---|
| 5,369,447 | A * | 11/1994 | Soloff | 348/627 |
| 6,141,642 | A * | 10/2000 | Oh | G10L 13/08 704/260 |
| 2001/0025241 | A1 * | 9/2001 | Lange | G10L 15/005 704/235 |
| 2002/0065074 | A1 * | 5/2002 | Cohn et al. | 455/422 |
| 2002/0095683 | A1 * | 7/2002 | Watanabe | 725/90 |
| 2002/0152267 | A1 * | 10/2002 | Lennon | 709/203 |
| 2003/0050058 | A1 * | 3/2003 | Walsh et al. | 455/426 |
| 2003/0086417 | A1 * | 5/2003 | Watanabe et al. | 370/352 |
| 2003/0093497 | A1 * | 5/2003 | Ohashi | 709/217 |
| 2003/0097571 | A1 * | 5/2003 | Hamilton et al. | 713/182 |
| 2003/0146977 | A1 * | 8/2003 | Vale et al. | 348/207.1 |
| 2003/0195927 | A1 * | 10/2003 | Virine et al. | 709/203 |
| 2003/0219225 | A1 * | 11/2003 | Horii et al. | 386/69 |
| 2003/0225834 | A1 * | 12/2003 | Lee et al. | 709/204 |
| 2004/0172257 | A1 * | 9/2004 | Liqin | G10L 13/00 704/277 |
| 2005/0004995 | A1 * | 1/2005 | Stochosky | H04L 12/1813 709/219 |
| 2005/0020223 | A1 * | 1/2005 | Ellis et al. | 455/186.1 |
| 2005/0021478 | A1 * | 1/2005 | Gautier et al. | 705/65 |
| 2005/0044143 | A1 * | 2/2005 | Zimmermann et al. | 709/204 |
| 2005/0182773 | A1 * | 8/2005 | Feinsmith | 707/100 |
| 2006/0015637 | A1 * | 1/2006 | Chung | 709/232 |
| 2006/0291446 | A1 * | 12/2006 | Caldwell et al. | 370/351 |
| 2008/0243476 | A1 * | 10/2008 | Gao | G10L 13/00 704/3 |

OTHER PUBLICATIONS

Yahoo!® Messenger with Voice Printout from website http://messenger.yahoo.com/features.php;_ylt=AvjsybKrP6ESnP7rEs7goD9wMMIF, print date: Jun. 15, 2006, pp. 1-3.
Microsoft Online Services—MSN Messenger Printout from website http://join.msn.com/messenger/features, print date: Jun. 15, 2006, pp. 1-3.
"WebEx, Reach the World", WebEx Communications, Inc., Apr. 1, 2005, pp. 1-16.

* cited by examiner

*Primary Examiner* — Parth Patel
*Assistant Examiner* — Jason Harley
(74) *Attorney, Agent, or Firm* — Troutman Sanders LLP; James E. Schutz; Brennan M. Carmody

(57) ABSTRACT

A first device captures content and streams the captured content to a second device as the first device continues to capture the content.

32 Claims, 26 Drawing Sheets

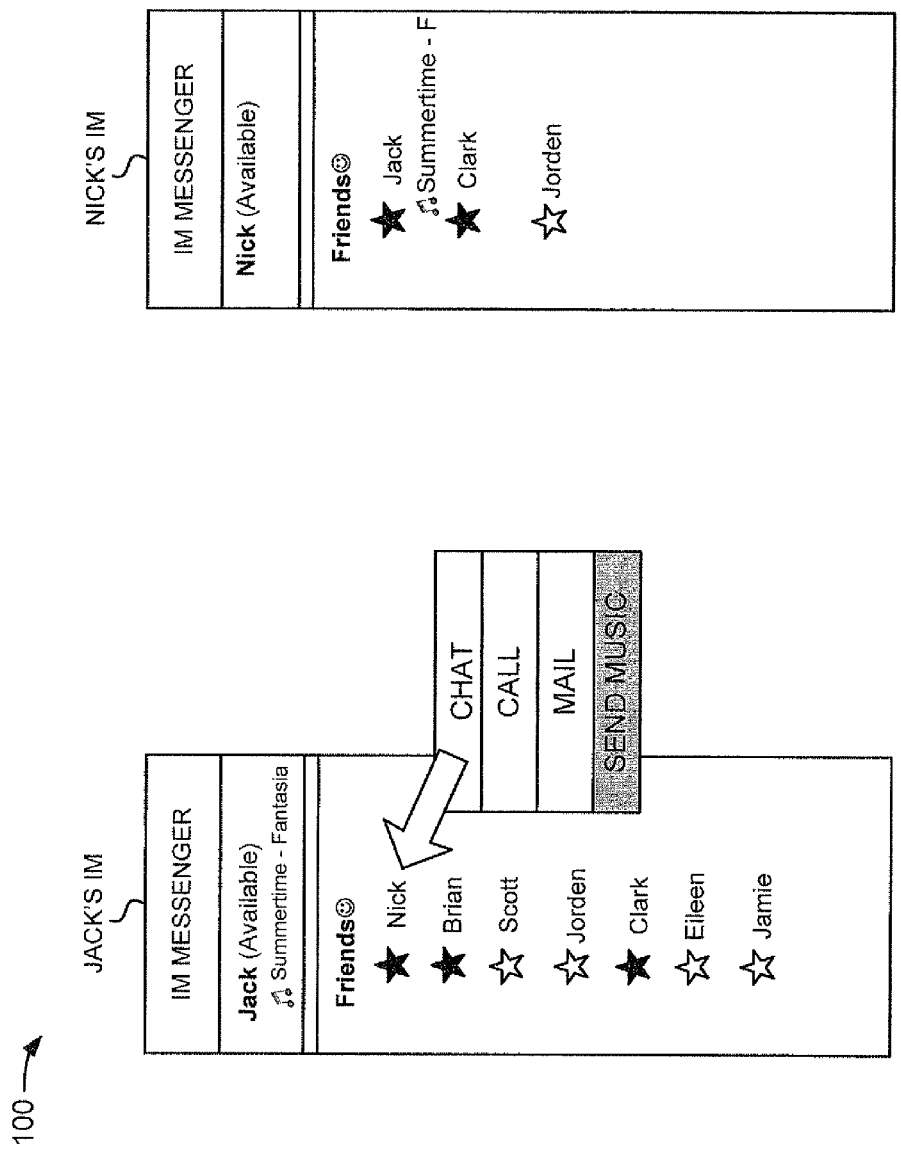

CONTENT SHARING

FIELD OF THE INVENTION

Implementations consistent with the principles of the invention relate generally to communication systems and, more particularly, to sharing content between devices.

BACKGROUND OF THE INVENTION

People use networks, such as the Internet, to share their thoughts, ideas, life experiences, problems, etc. with other people. For example, it is quite common for network users to share pictures, music files, and other information via web site posts, e-mail, instant messenger, etc. Currently, such sharing involves the transmission or downloading of image files, music files, etc. (e.g., via as an attachment to an e-mail).

SUMMARY OF THE INVENTION

In accordance with one implementation consistent with principles of the invention, a method may include receiving, from a first network device, a request for content that is currently playing on a second network device; capturing, based on the request, the content at the second network device; and streaming the captured content to the first network device.

In another implementation consistent with principles of the invention, a method may include sending, via a first network device, a request to send content that is currently playing on the first network device to at least one second network device; capturing, in response to the request being accepted, the content at the first network device; and providing the captured content to the at least one second network device.

In yet another implementation consistent with principles of the invention, a method may include capturing content via a first network device; and streaming the captured content from the first network device to a second network device as the first network device continues to capture the content.

In still another implementation consistent with principles of the invention, a method may include sending a title of a song currently playing on a first network device from a first instant messenger associated with the first network device to a second instant messenger associated with a second network device; capturing the song at the first network device; and streaming the captured song from the first instant messenger to the second instant messenger as the first network as the first network device captures the song.

BRIEF DESCRIPTION OF THE DRAWINGS

The accompanying drawings, which are incorporated in and constitute a part of this specification, illustrate one or more implementations of the invention and, together with the description, explain the invention. In the drawings, FIGS. 1A and 1B are diagrams illustrating an exemplary concept consistent with principles of the invention;

DETAILED DESCRIPTION

The following detailed description of implementations consistent with principles of the invention refers to the accompanying drawings. The same reference numbers in different drawings may identify the same or similar elements. Also, the following detailed description does not limit the invention.

OVERVIEW

The ability to share content with friends, family, coworkers, and others is an increasingly desired ability of users of network devices. Implementations consistent with principles of the invention allow users to stream audio, video, or other types of content in real time from the user's network device to one or more other network devices. For example, in one implementation consistent with principles of the invention, a network device may automatically detect which song a user is playing. The network device may take the audio on the user's network device and allow one or more other users to "listen in" to the user's audio stream in real time.

Figure 1B:
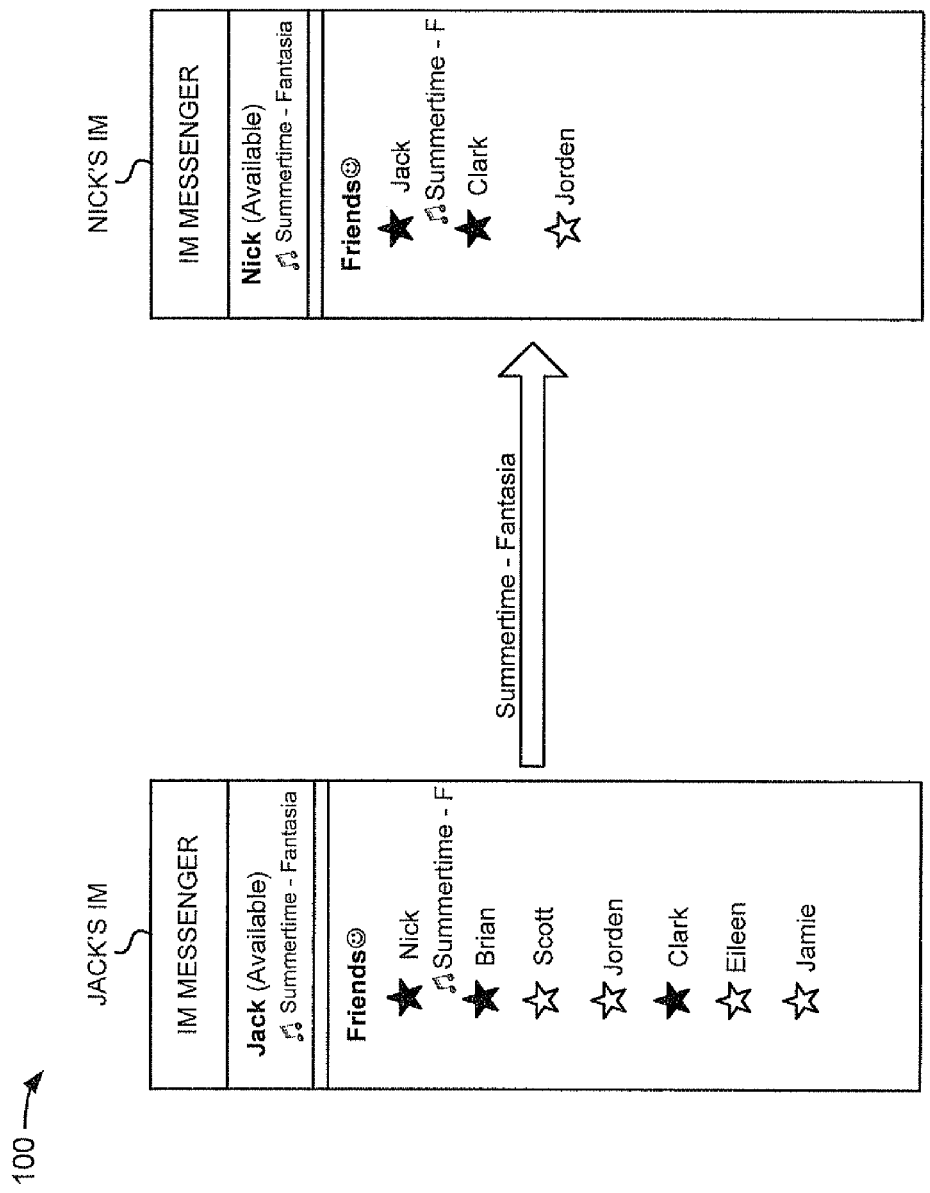

FIGS. 1A and 1B are diagrams illustrating an exemplary concept consistent with principles of the invention. As illustrated in FIG. 1A, assume that a first user ("Jack") is currently using an Instant Messenger (IM). Assume further that Jack is currently playing a song using an audio player on Jack's network device. Jack's network device may detect the song and display the title and artist of the song. Assume further that Jack wishes to share this song with his friend, Nick, who is also using an instant messenger. To share the song with Nick, Jack may select an option to send music to Nick by, for example, right clicking on Nick's name in Jack's instant messenger and selecting the "send music" option. In response, Jack's network device may send an audio request to Nick's network device to let Nick know that Jack wants to stream this song to Nick. If Nick accepts the request, Jack's network device may begin capturing the song playing on Jack's network device and may stream this captured audio to Nick's network device, as illustrated in FIG. 1B. As an alternative to the above, sharing the song may be based on Jack receiving a request for the song from Nick. In either case, Jack may share the song that is playing on Jack's network device with Nick in real time.

Exemplary Network Configuration

Figure 2:
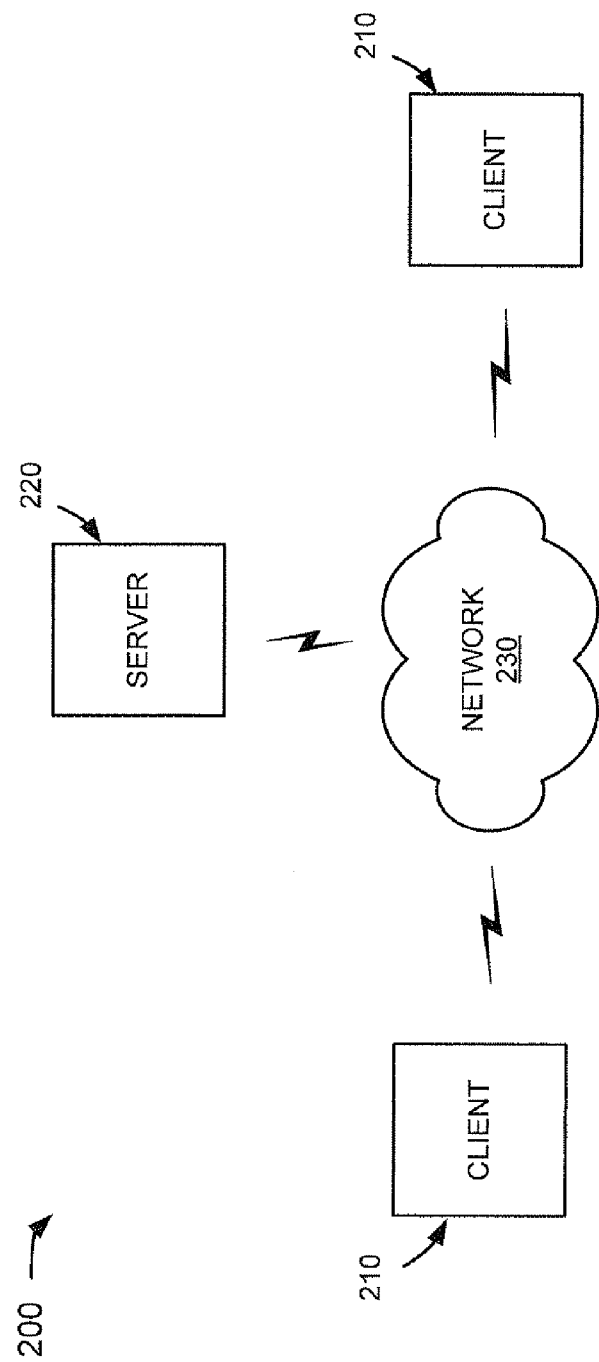
FIG. 2 is a diagram of an exemplary network in which systems and methods consistent with principles of the invention may be implemented.

FIG. 2 is a diagram of an exemplary network 200 in which systems and methods consistent with principles of the invention may be implemented. Network 200 may include multiple clients 210 and a server 220 that are interconnected via a network 230. Two clients 210 and one server 220 have been illustrated as connected to network 230 for simplicity. In practice, there may be more or fewer clients and servers. Also, in some instances, a client may perform a function of a server and a server may perform a function of a client.

Clients 210 may include client entities. An entity may be defined as a network device, such as a personal computer, a wireless telephone, a personal digital assistant (PDA), a laptop, or another type of computation or communication device, a thread or process running on one of these devices (e.g., an instant messenger (IM) program, a desktop program, etc.), and/or an object executable by one of these devices. Server 220 may include one or more server entities that receive and transmit content (e.g., audio, video, etc.) in a manner consistent with the principles of the invention.

Network 230 may include a local area network (LAN), a wide area network (WAN), a telephone network, such as the Public Switched Telephone Network (PSTN), an intranet, the Internet, another type of network, or a combination of networks. Clients 210 and server 220 may connect to network 230 via wired, wireless, and/or optical connections.

Exemplary Client/Server Architecture

Figure 3:
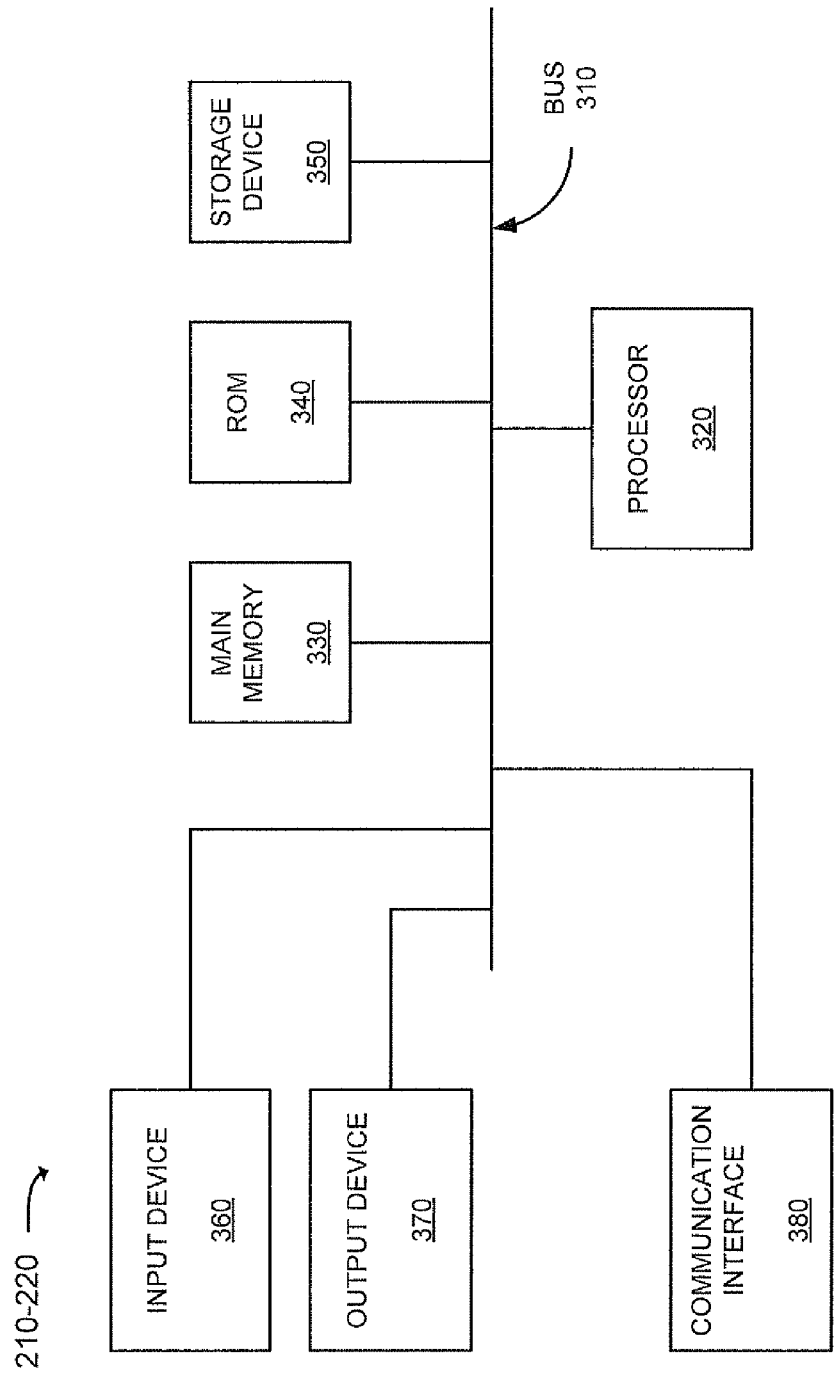
FIG. 3 is a diagram of an exemplary client or server entity in an implementation consistent with principles of the invention.

FIG. 3 is an exemplary diagram of a client or server entity (hereinafter called "client/server entity"), which may correspond to one or more of clients 210 and/or server 220. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 230.

As will be described in detail below, the client/server entity, consistent with the principles of the invention, may perform certain operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
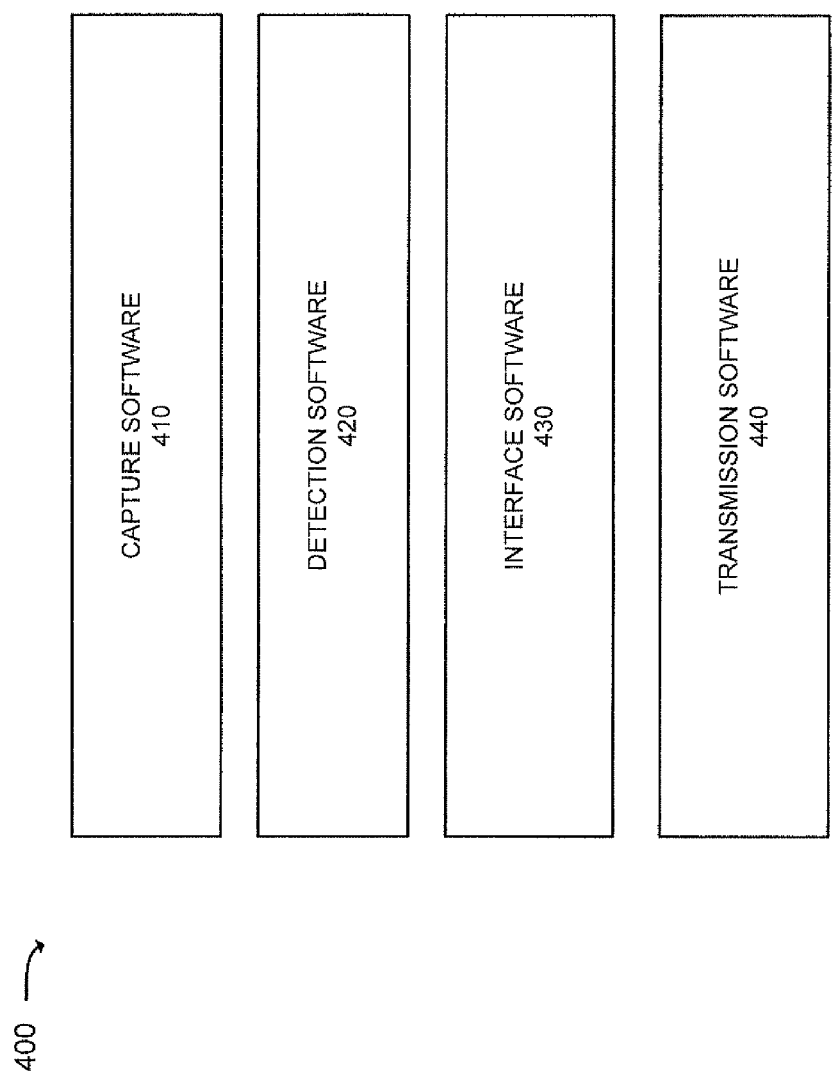
FIG. 4 is a diagram of a portion of an exemplary computer-readable medium that may be used by the client of FIG. 2.

FIG. 4 is a diagram of a portion of an exemplary computer-readable medium 400 that may be used by a client, such as client 210. In one implementation, computer-readable medium 400 may correspond to memory 330 of client 210. The portion of computer-readable medium 400 illustrated in FIG. 4 may include capture software 410, detection software 420, interface software 430, and transmission software 440.

Capture software 410 may include software that captures content on client 210. For example, in one implementation consistent with principles of the invention, capture software 410 may include an audio recorder and/or a video recorder. When capture software 410 includes an audio recorder, capture software 410 may, for example, capture audio on its way to or from the soundcard of client 210. When capture software 410 includes a video recorder, capture software 410 may, for example, capture video on its way to or from a video card of client 210 to create a captured video. In other implementations consistent with principles of the invention, capture software 410 may copy an audio/video file or identify an audio/video file that is being played by client 210.

Detection software 420 may include software that monitors audio/video playing on client 210. Detection software 420 may detect when audio/video starts, when audio/video stops, and/or information identifying the audio/video that is being played (e.g., a song title, an artist, etc.). Detection software 420 may be implemented as one or more .LIB files, one or more dynamic link library (DLL) files, one or more plug-ins, one or more stand-alone programs, etc. In an alternative implementation consistent with principles of the invention, detection software 420 may be implemented using a filter driver. For example, the filter driver may monitor file system accesses looking for audio/video file reads. As another alternative, detection software 420 may obtain information regarding the audio/video from another device. For example, detection software 420 may receive information identifying the audio/video playing on client 210 from a server from which the audio/video is being streamed. Detection software 420 may alternatively receive information identifying the audio/video from the server in response to a request for this information from client 210.

Interface software 430 may include software for generating or retrieving one or more interfaces. The interfaces may allow users of client 210 to indicate whether or not content can be streamed to or from one or more other clients.

Transmission software 440 may include software that facilitates the streaming of content from client 210 to one or more other clients. Transmission software 440 may, in one implementation consistent with principles of the invention, include software for encoding the content in a well known manner prior to transmission to the one or more other clients.

Providing Content to Client(s)

Figure 5:
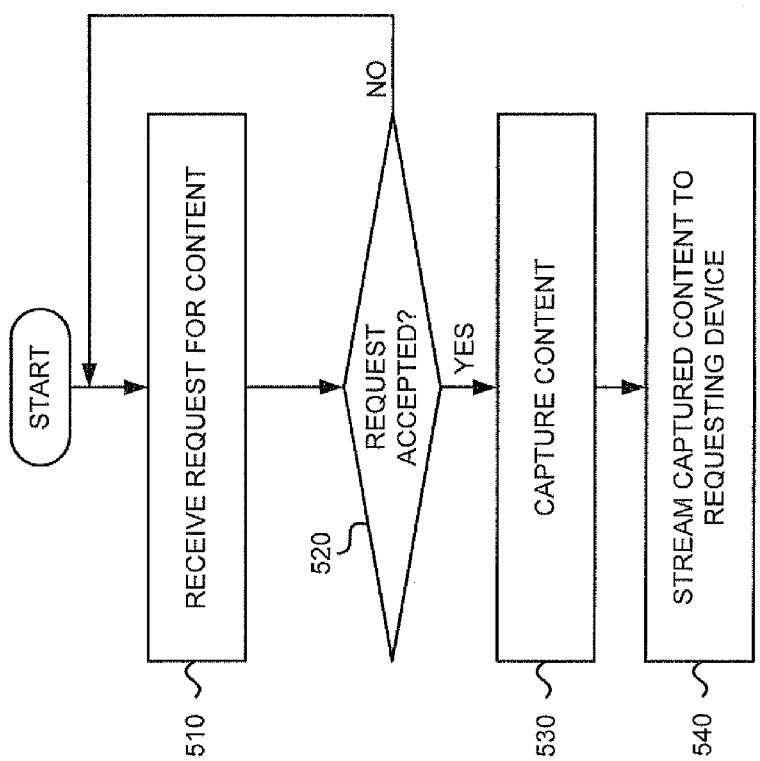
FIGS. 5 and 6 are flow charts of exemplary processes for providing content in implementations consistent with principles of the invention.

FIG. 5 is a flow chart of an exemplary process for providing content in an implementation consistent with principles of the invention. The processing described with respect to FIG. 5 may be performed by a client, such as client 210. Assume that client 210 is currently playing some type of content, such as a song, a video (e.g., a movie, a television program, etc.), etc. Client 210 may detect that the content is playing (e.g., via detection software 420) and display a title of the content for view by other clients. Client 210 may determine a title of the content in a number of different ways. For example, client 210 may determine a title for the content from an audio player, a video player, a server (e.g., by sending the content to a server, such as server 220, which identifies a title (and possibly other information) for the content and sends the title to client 210), or by other techniques. Assume further that another client (referred to as the "requesting client") desires to listen in on or view the content playing on client 210.

Processing may begin with client 210 receiving a request for content (block 510). The request may be received from another client (e.g., the requesting client) or another device in network 200. The request may include, for example, information identifying the requesting client and a request for content from client 210. The content may include, for example, audio (e.g., music, a radio talk show, etc.), video (e.g., a television program, a movie, a video of a user's interaction with one or more applications, etc.), dynamic graphics, or another type of content.

Client 210 may determine whether the request has been accepted (block 520). For example, receipt of the request may cause an interface to be displayed on client 210 (e.g., via interface software 430). The interface may allow the user of client 210 to indicate a desire to provide the content to the requesting client or not provide the content to the requesting client.

If the request for content is not accepted, processing may return to block 510 with client 210 receiving another request. If, on the other hand, the request for content is accepted, client 210 may begin capturing the content (block 530), for example, via capture software 410. For example, if the content is audio (e.g., music) that is playing on client 210, client 210 may begin capturing the audio when the request is accepted. If the content is video (e.g., a telephone program, a movie, etc.) that is playing on client 210, client 210 may begin capturing the video when the request is accepted.

The captured content may be streamed to the requesting client (block 540). The captured content may be streamed in a peer-to-peer manner or through one or more servers. Client 210 may encode the content prior to transmission to the requesting client (e.g., using transmission software 440). Playing of the content on the requesting client may be synchronized to the playing of the content on client 210. For example, assume that the content includes a song. If client 210 is approximately 3 minutes into the song at the time that the request is accepted, the requesting client may receive the song approximately 3 minutes into the song. In this way, the playing of the song is synchronized on client 210 and the requesting client.

In addition to receiving the streaming content from client 210, the requesting client may receive information relating to the content from client 210 or from another device, such as server 220. The information may include, for example, information about the content (e.g., the title, the artist, etc.). The information may also or alternatively include advertisements related to the content (e.g., where a user can buy a CD containing the song).

In those situations where the content includes audio (e.g., a song) or video (e.g., a movie, a television program, etc.), client 210 may detect (e.g., via detection software 420) the starting and stopping of the content and provide that information, along with information identifying the content (e.g., a song title, a movie title, a television program title, etc.), to a server, such as server 220. In this way, server 220 may track the music, movies, television programs, etc. being played on client 210, along with the time that the content is played and/or geographical area in which client 210 is located. By tracking this information across a number of clients 210, a Zeitgeist may be created (e.g., a music Zeitgeist, a movie Zeitgeist, a television program Zeitgeist, etc.) to show one or more trends or patterns of content for a particular region (e.g., a state, a country, etc.), for a particular time period (e.g., a day, a month, a year, etc.), for a particular genre, etc.

Figure 6:
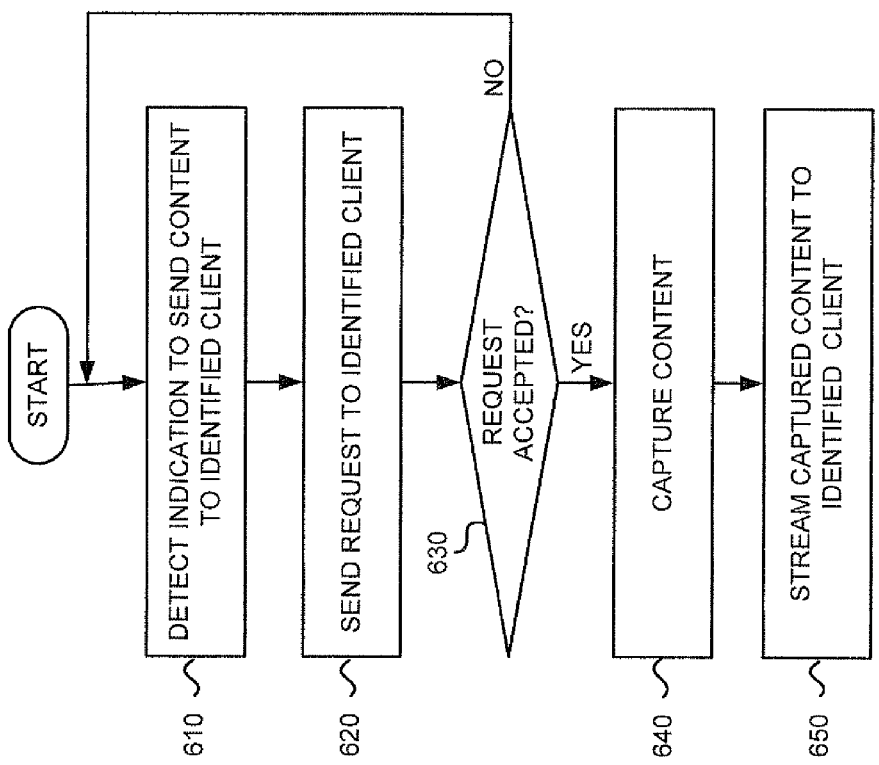

FIG. 6 is a flow chart of an exemplary process for providing content in an implementation consistent with principles of the invention. The processing described with respect to FIG. 6 may be performed by a client, such as client 210.

Processing may begin by detecting an indication to send content to an identified device, such as another client (block 610). In one implementation consistent with principles of the invention, client 210 may provide an interface to a user of client 210 (e.g., via interface software 430). The interface may allow the user to identify the content to provide and the client (or clients) to which the content is to be streamed. For example, the user may indicate a desire to send audio, video, dynamic graphics, etc. to one or more other clients. The indication of the type of content and the client or clients to which the content is to be provided may be made via a popup menu, a pull-down menu, a toolbar menu, or in other well-known ways.

In response to detecting the indication, client 210 may generate and send a request to the client or clients (block 620). For example, the request may include information identifying client 210 and information identifying the content (e.g., the type of content, information identifying a title associated with the content, and/or other information).

The request may cause an interface to be displayed on the client or clients. The interface may ask the user of each client whether he/she wants to receive the content. If the user accepts the request, an acceptance message may be sent to client 210. If, on the other hand, the user does not accept the request, a rejection message may be sent to client 210.

Client 210 may determine whether the request was accepted by the client(s) (block 630). If the request is not accepted, processing may return to block 610 with client 210 detecting another indication to send content. If, on the other hand, the request is accepted, client 210 may begin capturing the content (block 640). For example, if the content is audio (e.g., music) that is playing on client 210, client 210 may begin capturing (e.g., recording) the audio when the request is accepted. If the content is video (e.g., a telephone program, a movie, etc.) that is playing on client 210, client 210 may begin capturing (e.g., recording) the video when the request is accepted. In another implementation, capture software 410 may begin capturing the user's interaction with one or more applications associated with client 210. For example, the client to which the content is to be sent may be associated with an information technology department. The user may be experiencing problems with an application associated with client 210 (e.g., a word processing application). The user may cause client 210 to capture (e.g., record) the user's interaction with the word processing application and stream the captured video (or screen shots) to the client associated with the information technology department.

The captured content may be streamed to the client(s) (block 650). The captured content may be streamed in a peer-to-peer manner or through a server. Client 210 may encode the content prior to transmission to the client(s) (e.g., via transmission software 440). Playing of the content on the client(s) may be synchronized to the playing of the content on client 210. For example, assume that the content includes a movie. If client 210 is approximately 10 minutes into the movie at the time that the request is accepted and the capturing begins, the client(s) may receive the movie approximately 10 minutes into the movie. In this way, the playing of the movie is synchronized on client 210 and the client(s) to which the movie is streamed.

In addition to receiving the streaming content from client 210, the requesting client may receive information relating to the content from client 210 or from another device, such as server 220. The information may include, for example, information about the content (e.g., the title, the artist, etc.). The information may also or alternatively include advertisements related to the content (e.g., where a user can buy a CD containing the song).

Examples

The following examples illustrate the processing described above with respect to FIGS. 5 and 6. In the first example 700, assume that a user (Pete) is currently running an instant messenger 710. Assume further that a number of Pete's friends are also currently running instant messengers (e.g., the black stars indicate friends that are currently running instant messengers while the white stars indicate friends that are not currently running instant messengers). Assume that Pete is currently listening to a song entitled "Summertime" by the artist "Fantasia" and wants his friend "Bill" to listen to the song.

To push the song to Bill, Pete may select Bill as his destination (e.g., by right-clicking on Bill's name in instant messenger 710) and may identify the desire to send audio to Bill (e.g., by selecting "SEND AUDIO" in a popup window, such as popup window 712). Other ways of identifying a desire to send audio to Bill may alternatively be used.

Figure 7A:
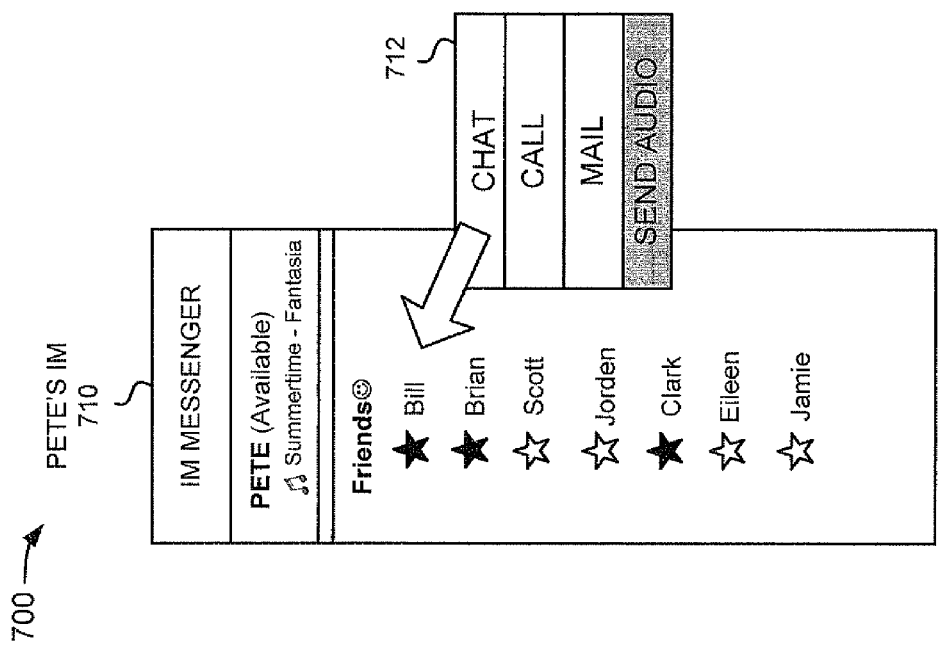
FIGS. 7A-11 provide illustrative examples of the exemplary processes of FIGS. 5 and 6.
Figure 7B:
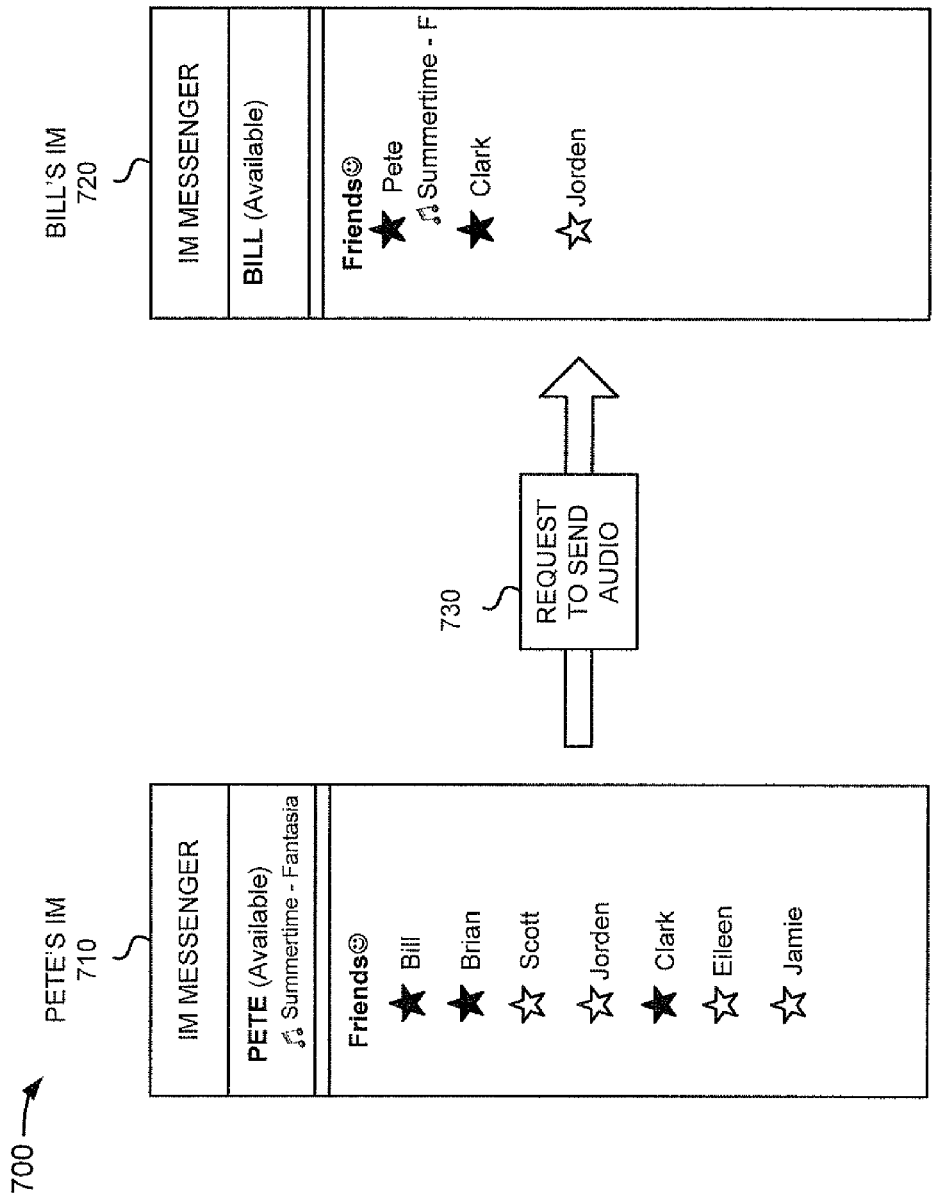
Figure 7C:
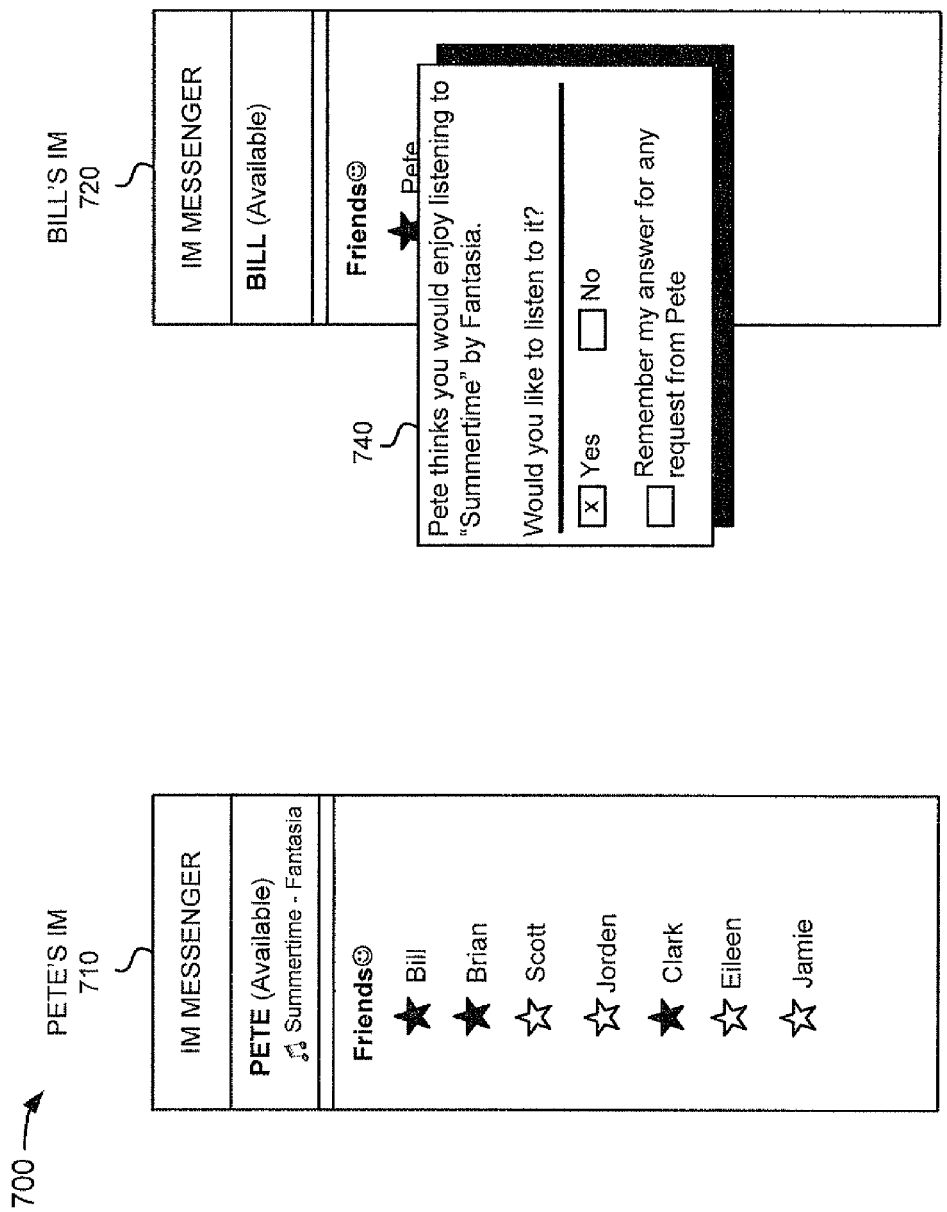

Pete's instant messenger 710 may send a message 730 to Bill's instant messenger 720 indicating Pete's desire to send audio to Bill, as illustrated in FIG. 7B. Upon receipt of message 730, Bill's instant messenger 720 may cause a popup window, such as popup window 740, to be presented to Bill, as illustrated in FIG. 7C. Popup window 740 may allow Bill to indicate whether or not he wishes to listen to the song to which Pete is currently listening. Assume that Bill indicates that he wishes to listen to the song, as illustrated in FIG. 7C.

Figure 7D:
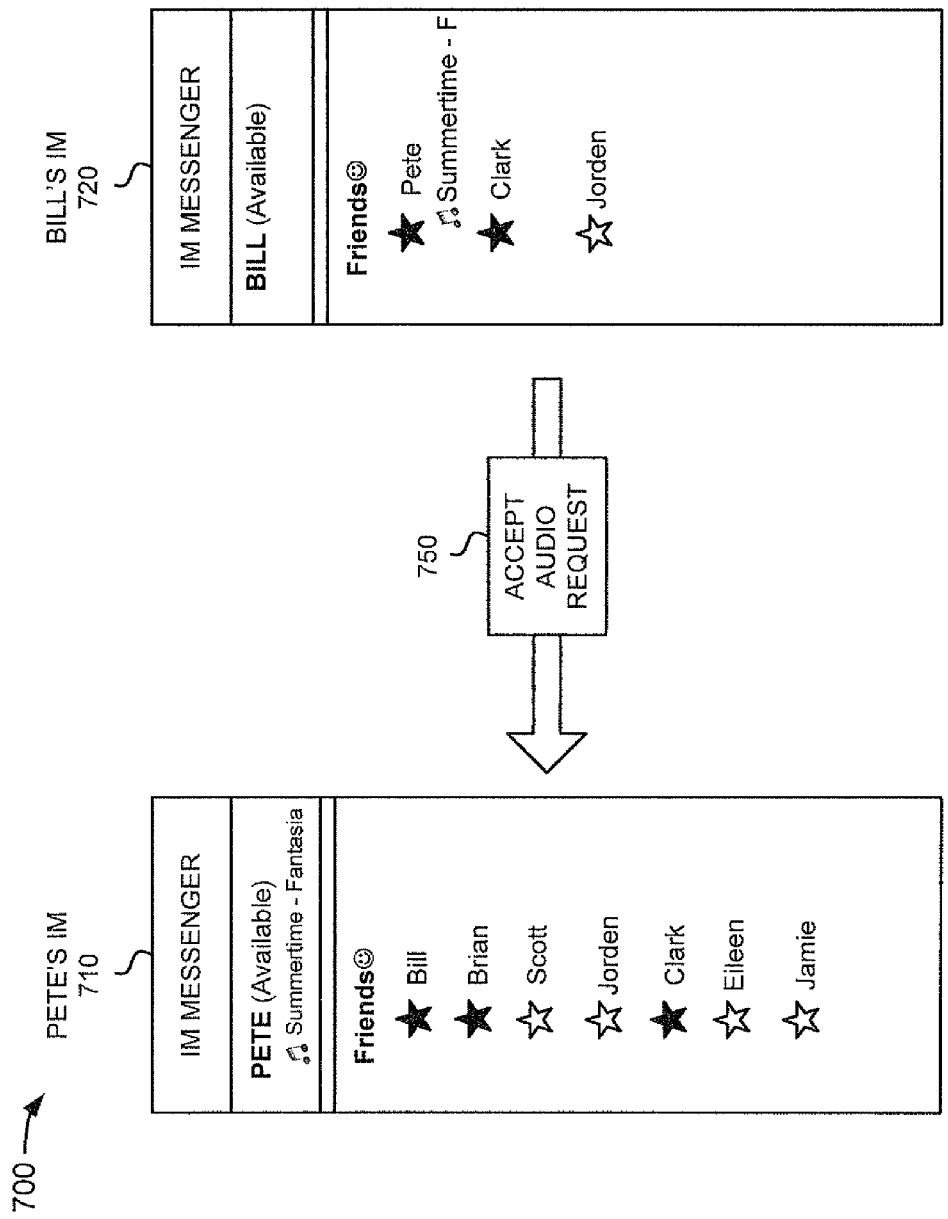
Figure 7E:
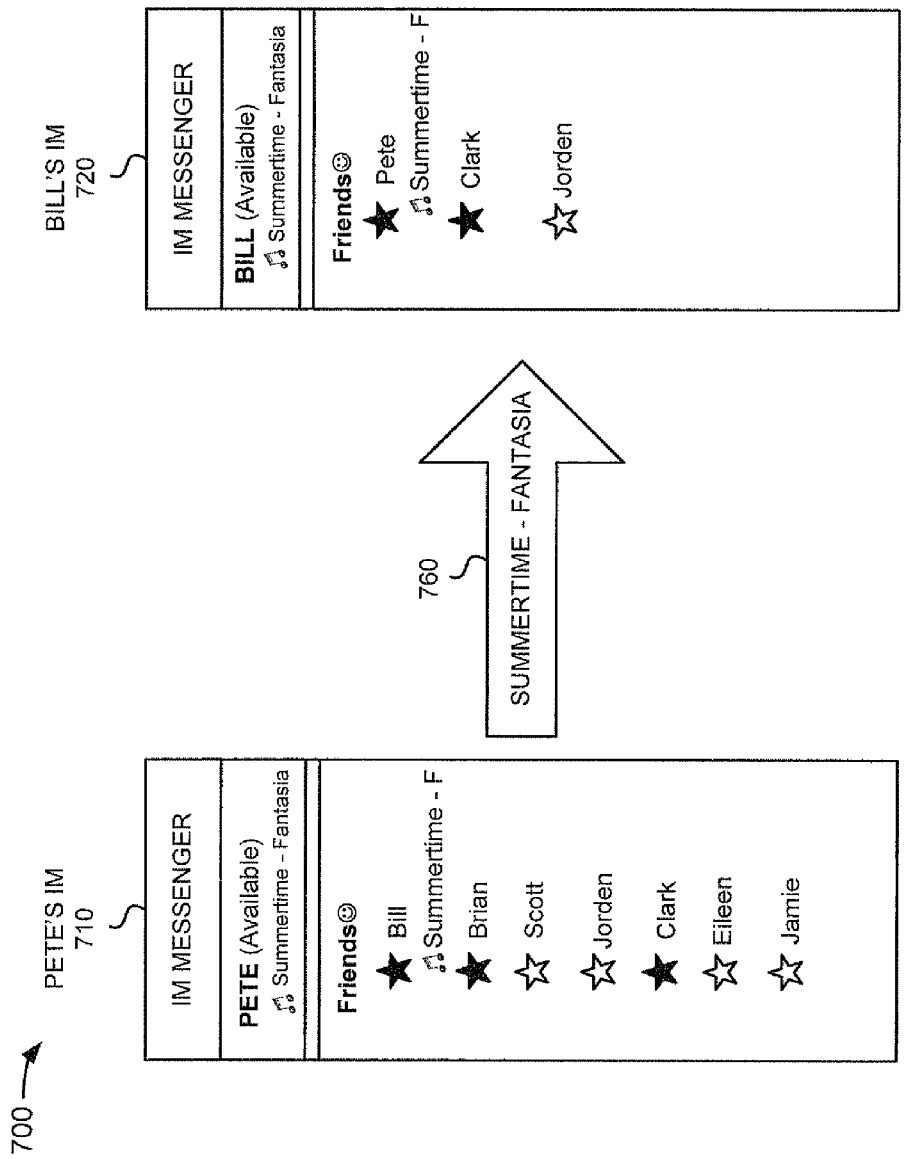

Bill's instant messenger 720 may send a message 750 to Pete's instant messenger 710 indicating that Bill has accepted Pete's audio request, as illustrated in FIG. 7D. Upon receipt of message 750, the network device on which Pete's instant messenger 710 is running may begin capturing the song playing on Pete's network device. Pete's instant messenger 710 may then stream the captured audio 760 to Bill's instant messenger 720, as illustrated in FIG. 7E. The streaming may be in a peer-to-peer manner (i.e., Pete's instant messenger 710 may stream captured audio 760 directly to Bill's instant messenger 720) or, as will be described in further detail below, through a server, such as server 220 (i.e., Pete's instant messenger 710 may stream captured audio 760 to server 220, which may stream captured audio 760 to Bill's instant messenger 720). In this way, Pete can allow Bill to listen in on music to which Pete is currently listening. Moreover, the streaming of the audio from Pete to Bill occurs in a synchronized manner. That is, if Pete is approximately 2 minutes into the song when acceptance message 750 is received and the capturing of the song begins, Bill will hear the song beginning at approximately 2 minutes into the song.

Figure 8A:
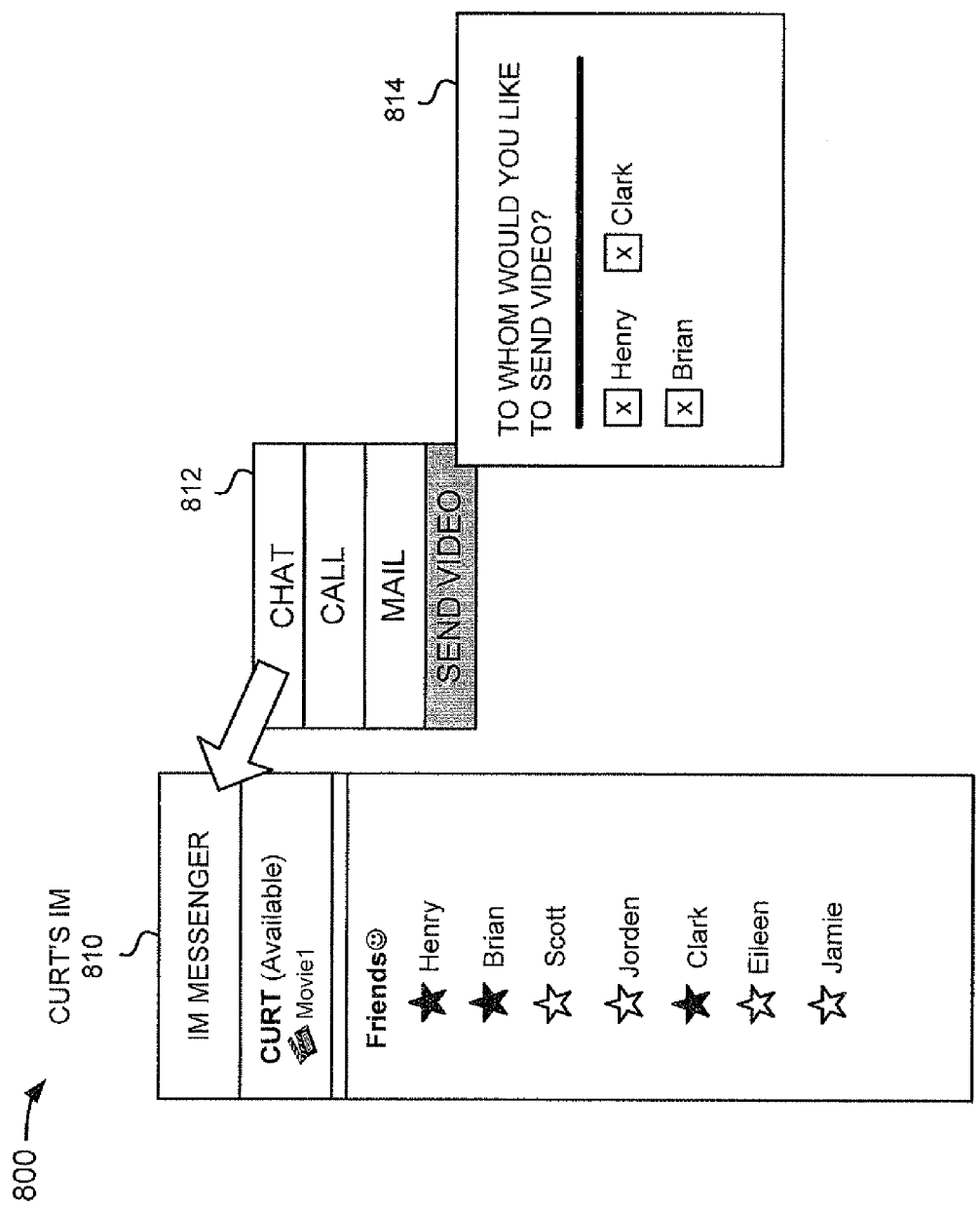

In the second example 800, assume that a user (Curt) is currently running an instant messenger 810, as illustrated in FIG. 8A. Assume further that a number of Curt's friends are also currently running instant messengers (e.g., the black stars indicate friends that are currently running instant messengers while the white stars indicate friends that are not currently running instant messengers). Assume that Curt is currently watching a movie entitled "Movie1" and wants several of his friends to watch the movie (or at least a portion thereof).

To push the movie to his friends, Curt may identify a desire to send video (e.g., by selecting "SEND VIDEO" in a popup window 812 or in some other manner) and select which of his friends to which the movie is to be pushed (e.g., by selecting the friends in a popup window 814 in instant messenger 810 or in some other manner), as illustrated in FIG. 8A. Other ways of identifying a desire to send video and selecting the destination(s) for the video may alternatively be used.

Figure 8B:
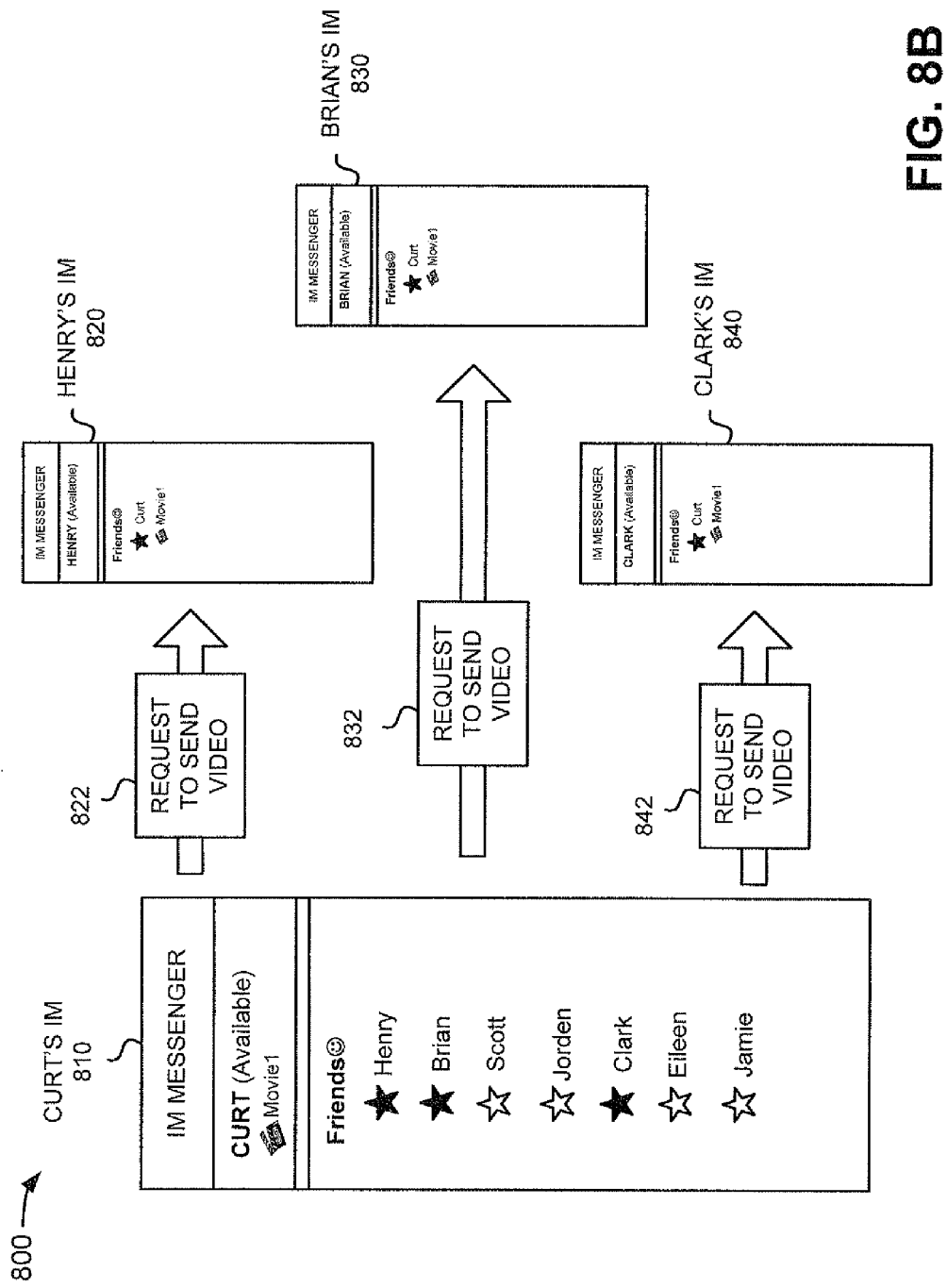

Assume, as illustrated in FIG. 8A, that Curt has indicated that he wants to push the movie to Henry, Brian, and Clark. Curt's instant messenger 810 may send messages 822, 832, and 842 to Henry's instant messenger 820, Brian's instant messenger 830, and Clark's instant messenger 840, respectively, indicating Curt's desire to send video to Henry, Brian, and Clark, as illustrated in FIG. 8B. Upon receipt of message 822, Henry's instant messenger 820 may cause a popup window to be presented to Henry in a manner similar to that described above with respect to FIG. 7C. The popup window may allow Henry to indicate whether or not he wishes to receive the video being viewed by Curt. Similarly, popup windows may be presented to Brian and Clark, allowing Brian and Clark to indicate whether they want to receive the video currently being viewed by Curt. Assume that Henry and Brian indicate that they wish to receive the movie and Clark indicates that he does not wish to receive the movie.

Figure 8C:
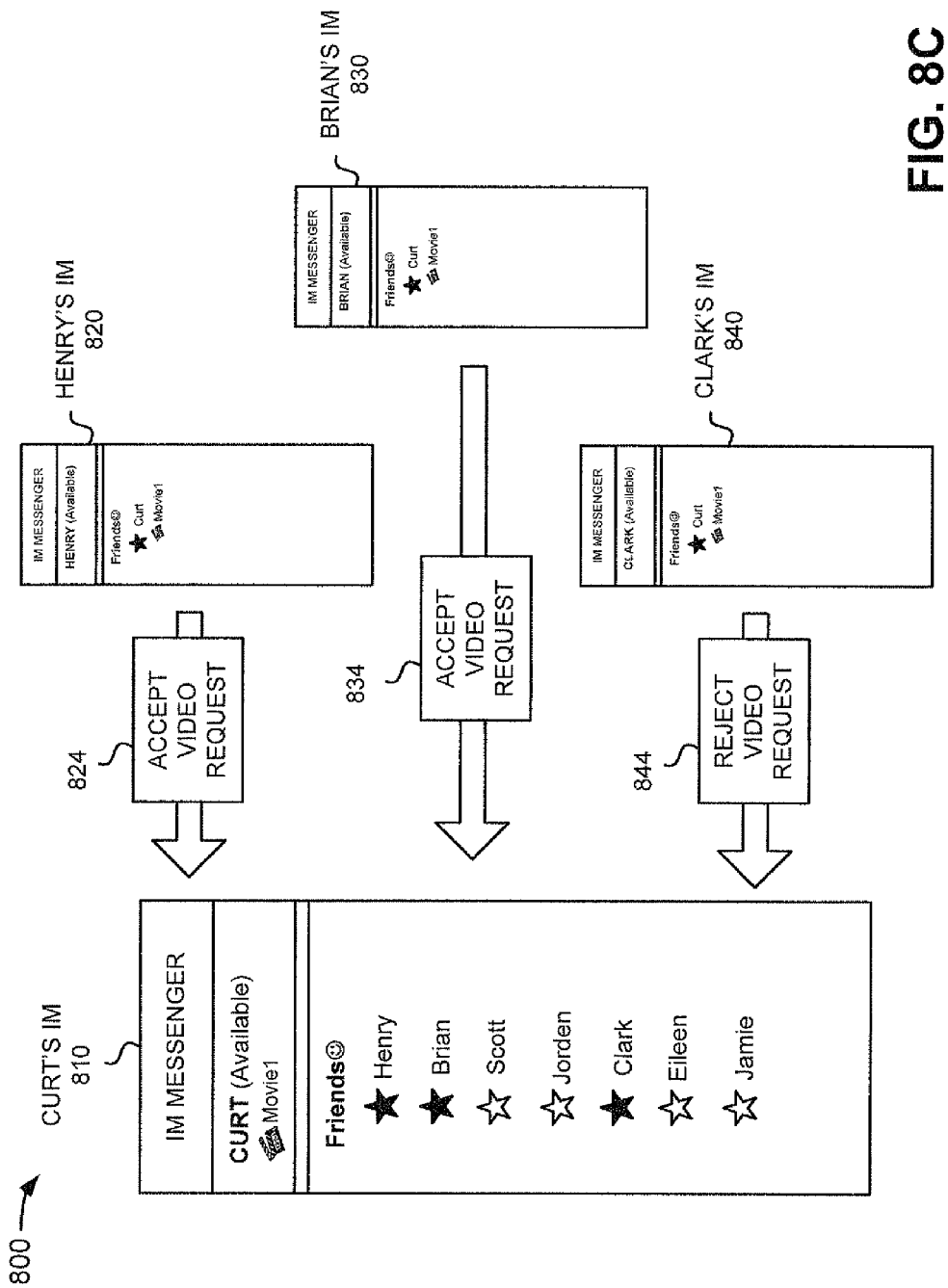
Figure 8D:
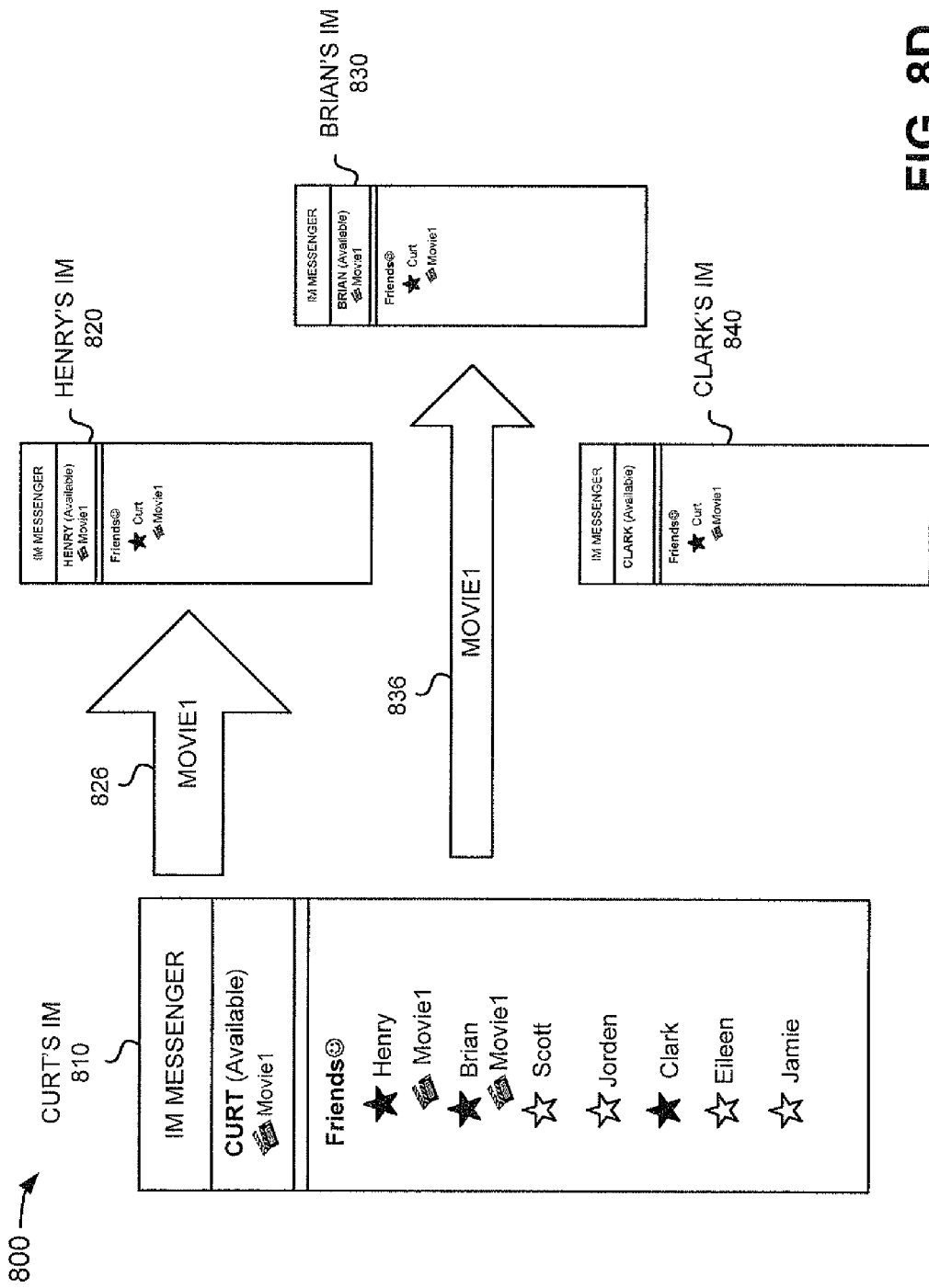

Henry's instant messenger 820 and Brian's instant messenger 830 may send messages 824 and 834, respectively, to Curt's instant messenger 810 indicating that they accept Curt's video request, as illustrated in FIG. 8C. Clark's instant messenger 840 may send a message 844 to Curt's instant messenger 810 indicating that he does not accept Curt's video request, as illustrated in FIG. 8C. Upon receipt of messages 824 and 834, the network device on which Curt's instant messenger 810 is running may begin capturing the movie playing on Curt's network device. Curt's instant messenger 810 may then stream the captured video 826/836 to Henry's instant messenger 820 and Brian's instant messenger 830, as illustrated in FIG. 8D. The streaming may be in a peer-to-peer manner (i.e., Curt's instant messenger 810 may stream captured video 826/836 directly to Henry's instant messenger 820 and Brian's instant messenger 830) or, as will be described in further detail below, through a server, such as server 220 (i.e., Curt's instant messenger 810 may stream captured video 826/836 to server 220, which may stream captured video 826/836 to Henry's instant messenger 820 and Brian's instant messenger 830). In this way, Curt can allow Henry and Brian to view the movie currently playing on Curt's network device. Moreover, the streaming of the movie from Curt to Henry and Brian occurs in a synchronized manner. That is, if Curt is approximately 10 minutes into the movie when acceptance messages 824 and 834 are received and the capturing of the movie begins, Henry and Brian will begin seeing the movie at approximately 10 minutes into the movie.

In the third example 900, assume that a user (Steve) is currently running an instant messenger 920. The network device on which Steve is running instant messenger 920 may monitor the various media players that are associated with the network device to determine if any of the media players are currently playing music. Assume that Steve is listening to a song entitled "Song1" by an artist "Artist1" using one of the media players associated with the network device. Steve's instant messenger 920 may obtain the title of the song (i.e., Song1) and the artist (i.e., Artist1) and cause that information (and possibly other information) to be displayed on other instant messengers, such as Carol's instant messenger 910, with which Steve's instant messenger 920 is associated.

Assume further that Carol wants to listen in on the song to which Steve is listening. To listen in on the song, Carol may identify the desire to listen to the audio (e.g., by right-clicking Steve's name in instant messenger 910 and selecting "LISTEN IN" in a popup window, such as popup window 912). Other ways of identifying a desire to listen to audio to which Steve is listening may alternatively be used.

Figure 9A:
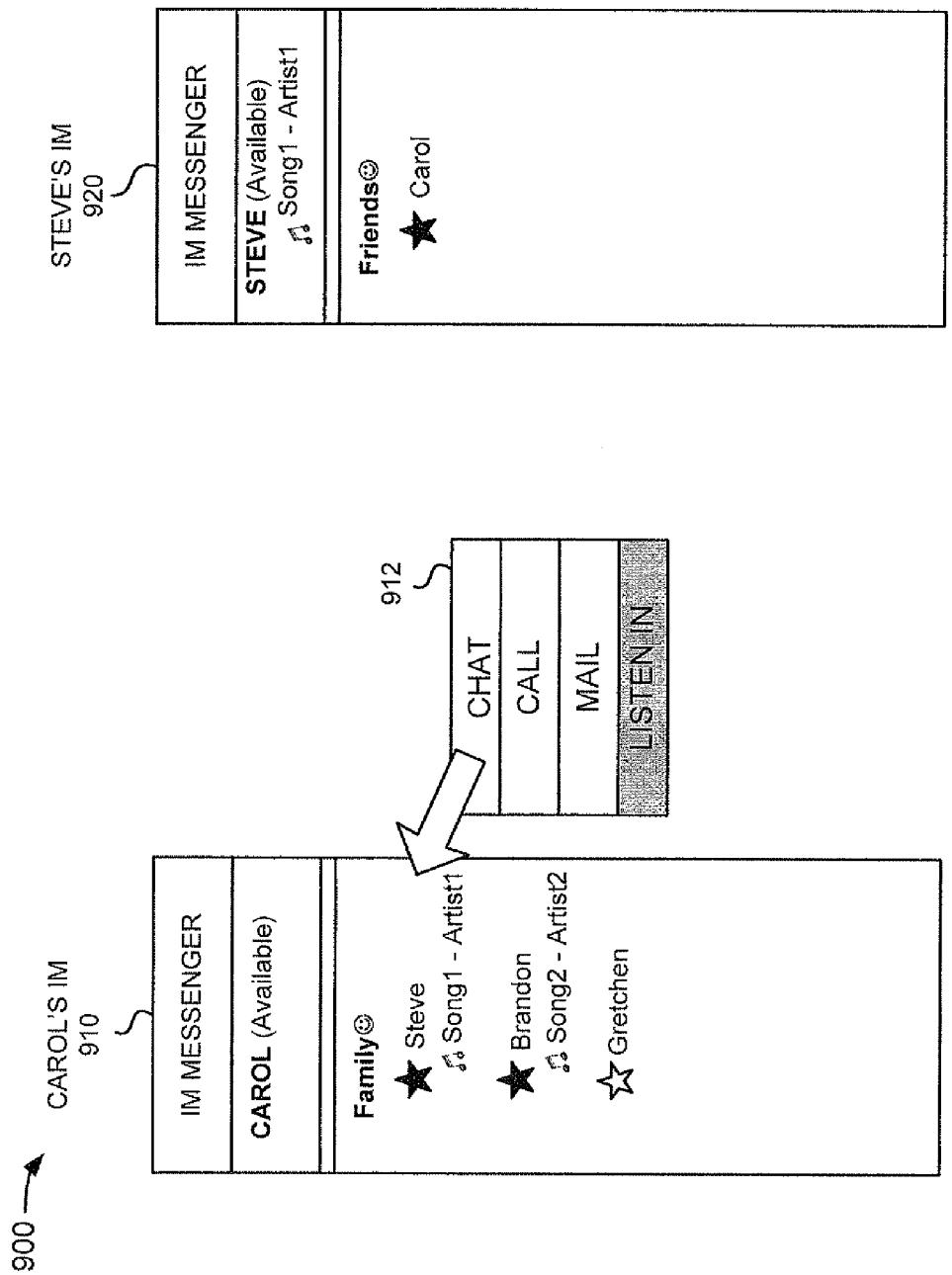
Figure 9B:
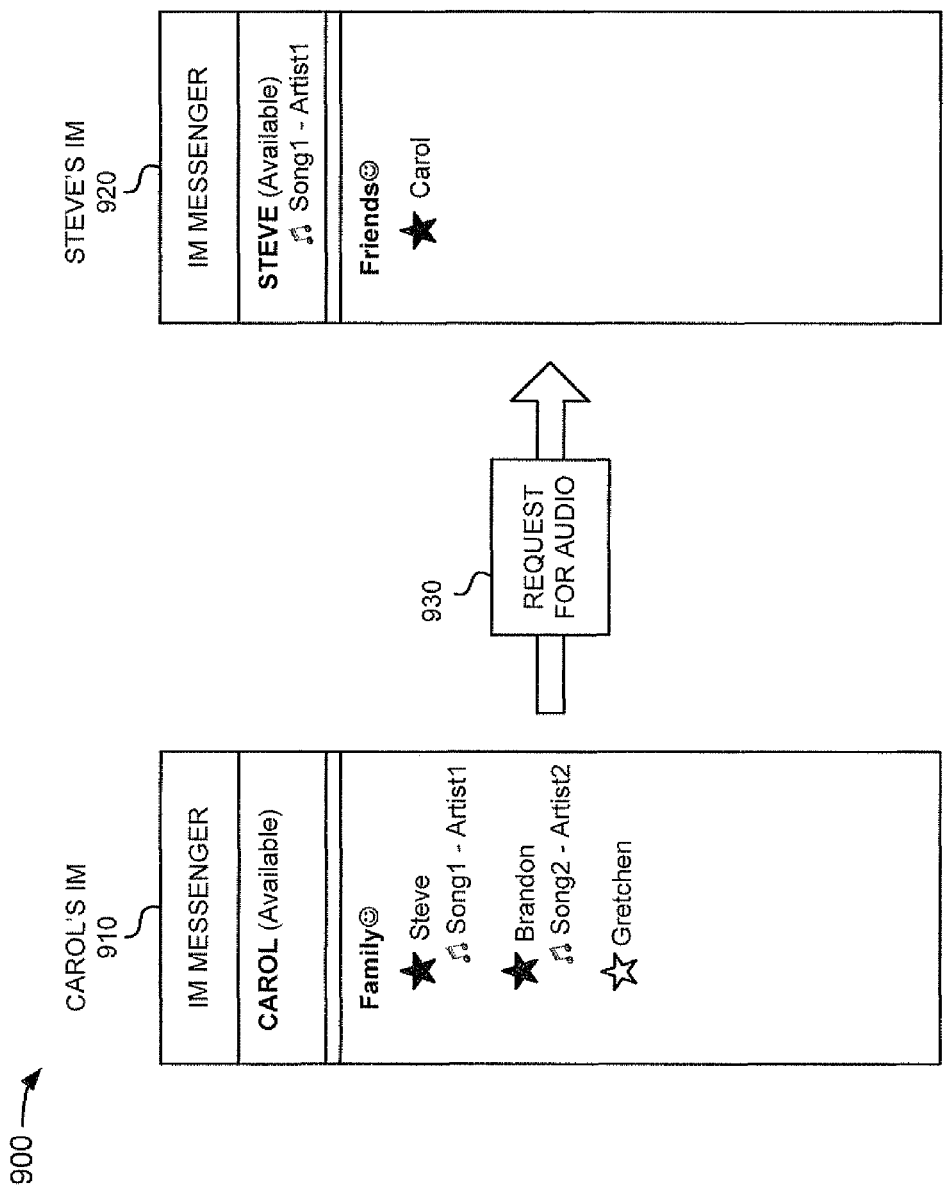
Figure 9C:
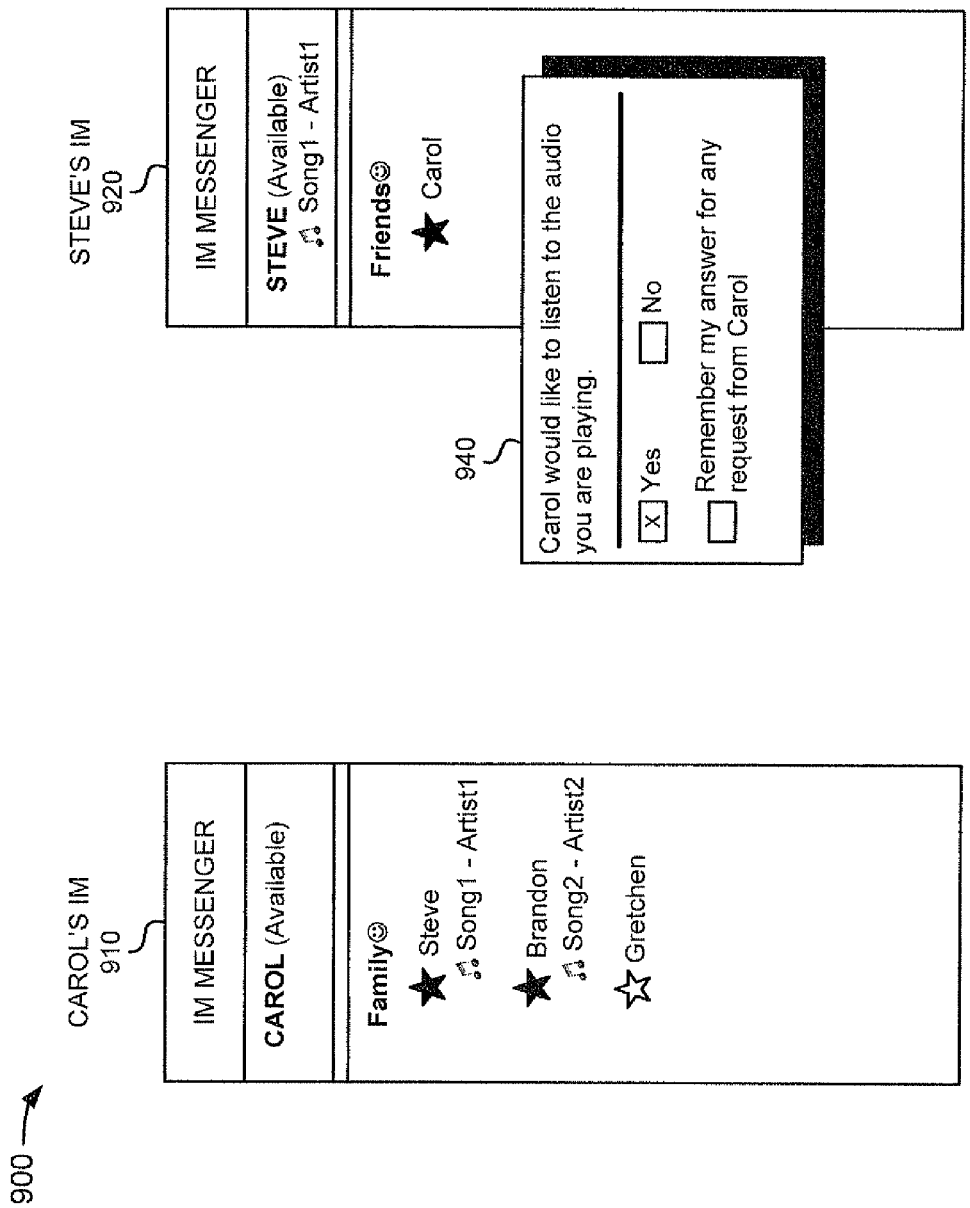

Carol's instant messenger 910 may send a message 930 to Steve's instant messenger 920 indicating Carol's desire to listen to the audio to which Steve is listening, as illustrated in FIG. 9B. Upon receipt of message 930, Steve's instant messenger 920 may cause a popup window, such as popup window 940, to be presented to Steve, as illustrated in FIG. 9C. Popup window 940 may allow Steve to indicate whether or not he wishes to allow Carol to listen to the song to which Steve is currently listening. Assume that Steve indicates that he will allow Carol to listen to the song, as illustrated in FIG. 9C.

Figure 9D:
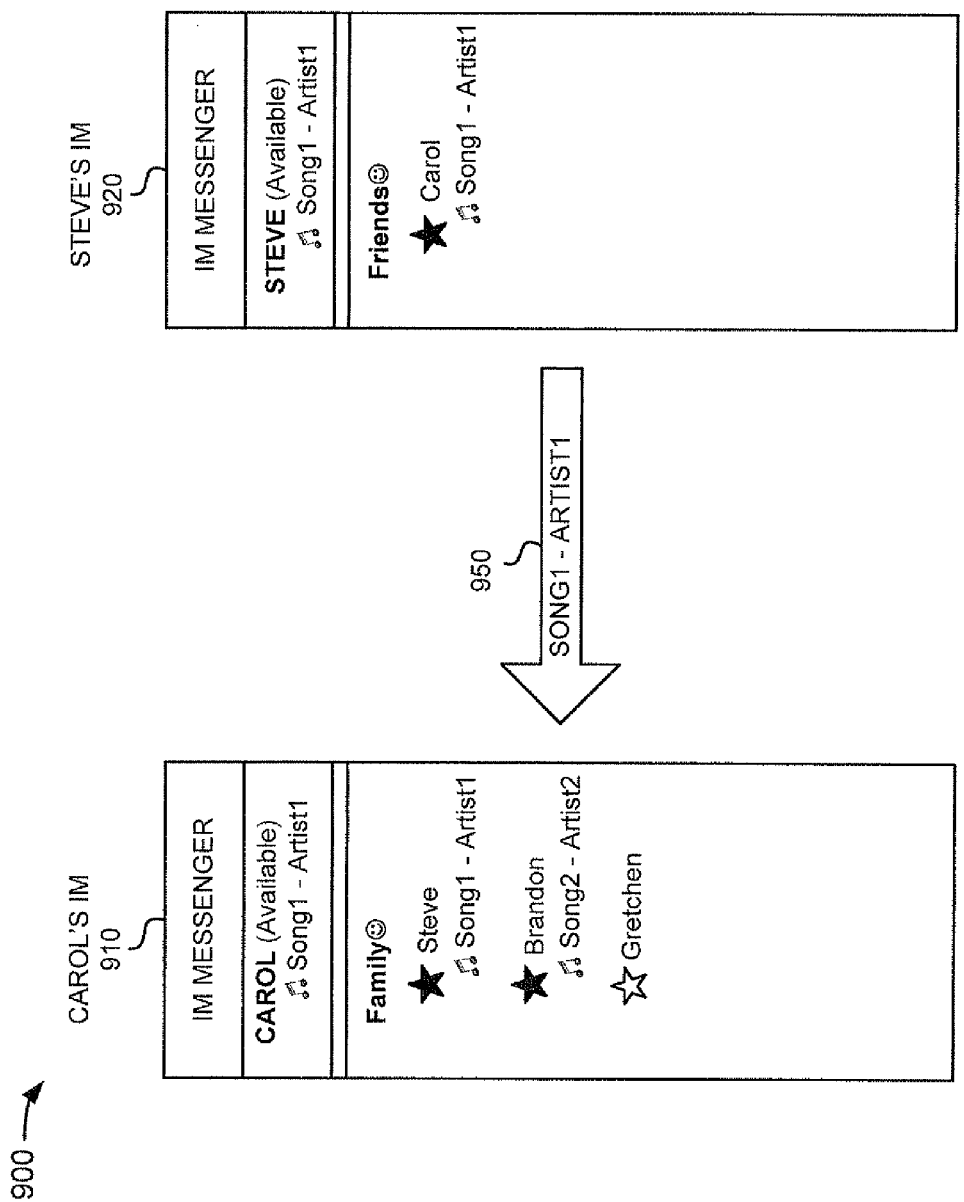

Upon indicating that Carol may listen to the song in popup window 940, the network device on which Steve's instant messenger 920 is running may begin capturing the song playing on Steve's network device. Steve's instant messenger 920 may then stream the captured audio 950 to Carol's instant messenger 910, as illustrated in FIG. 9D. The streaming may be in a peer-to-peer manner (i.e., Steve's instant messenger 920 may stream captured audio 950 directly to Carol's instant messenger 910) or, as will be described in further detail below, through a server, such as server 220 (i.e., Steve's instant messenger 920 may stream captured audio 950 to server 220, which may stream captured audio 950 to Carol's instant messenger 910). In this way, Steve can allow Carol to listen in on music to which Steve is currently listening. Moreover, the streaming of the music from Steve to Carol occurs in a synchronized manner. That is, if Steve is approximately 2 minutes into the song when Steve indicates that Carol may listen to the song and the capturing of the song begins, Carol will hear the song beginning at approximately 2 minutes into the song.

In the fourth example 1000, assume that a user (Matt) is currently running an instant messenger 1010. Assume further that a co-worker of Matt's (Kim) is also currently running an instant messenger (e.g., the black star indicates other instant messengers that are currently running). Assume that Matt wants Kim to view a drawing that he is creating.

Matt may select Kim as his destination (e.g., by right-clicking on Kim's name in instant messenger 1010) and may identify the desire to send video to Kim (e.g., by selecting "SEND VIDEO" in a popup window, such as popup window 1012). Other ways of indicating a desire to send video to Kim may alternatively be used.

Matt may further specify the location from where the video is to be captured. Matt may specify that his interaction with a particular application or applications is to be (cap-tured (e.g., recorded) or may specify that all interactions with his network device are to be captured. Matt may make these specifications via one or more popup windows, such as popup windows 1014 and 1016, provided by instant messenger 1010. In this example, assume that Matt specifies that his interaction with a drawing application is to be captured.

Figure 10A:
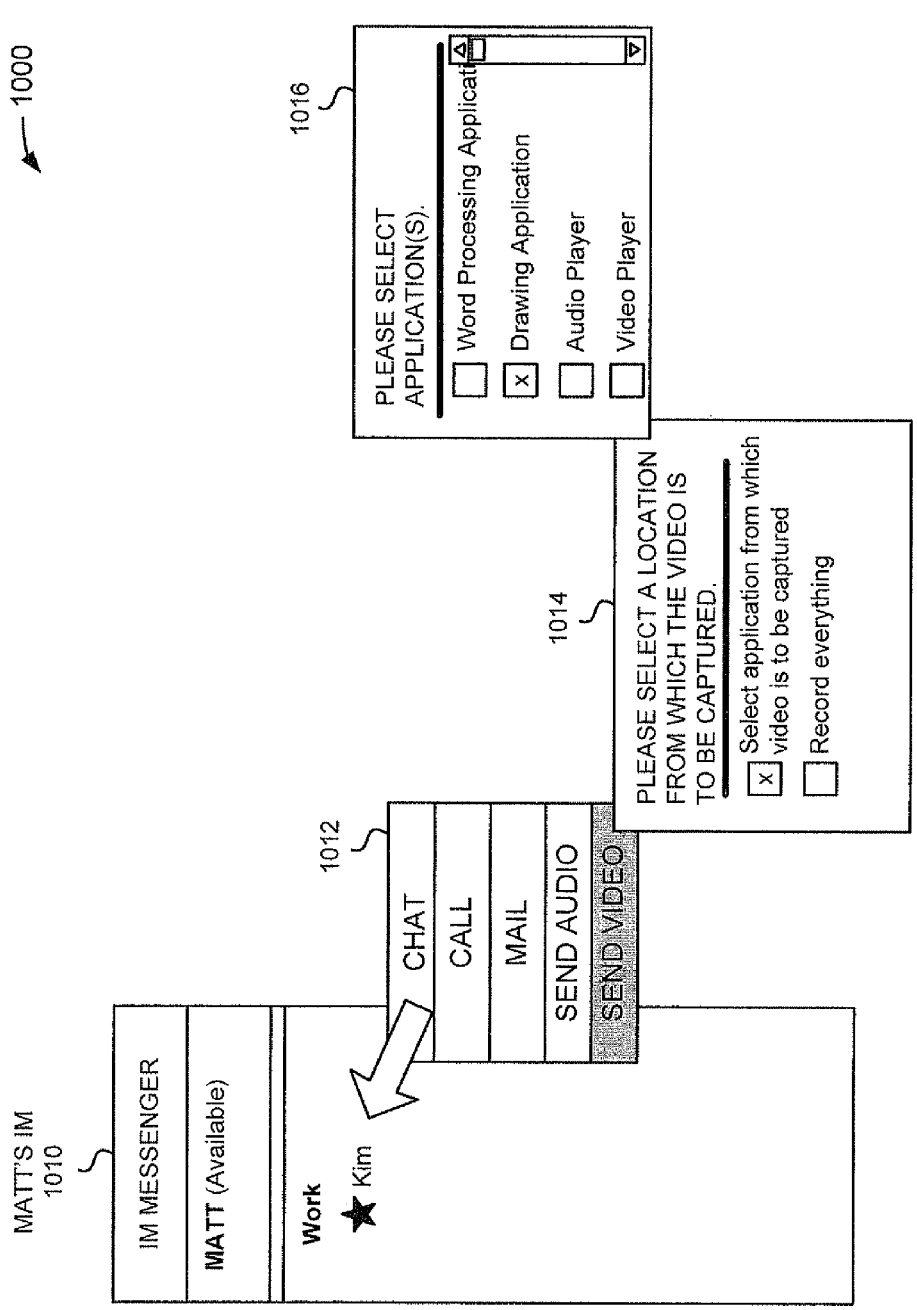
Figure 10B:
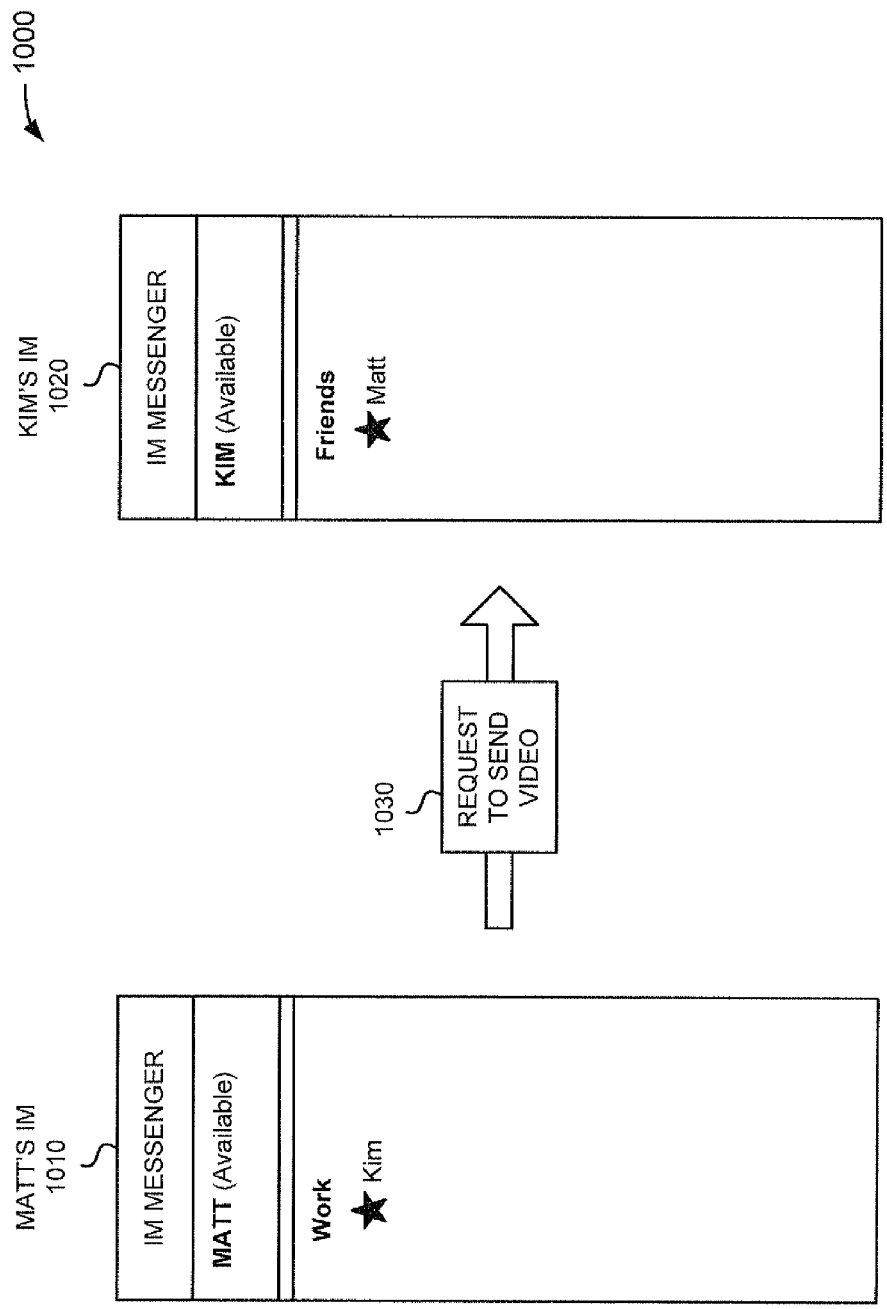
Figure 10C:
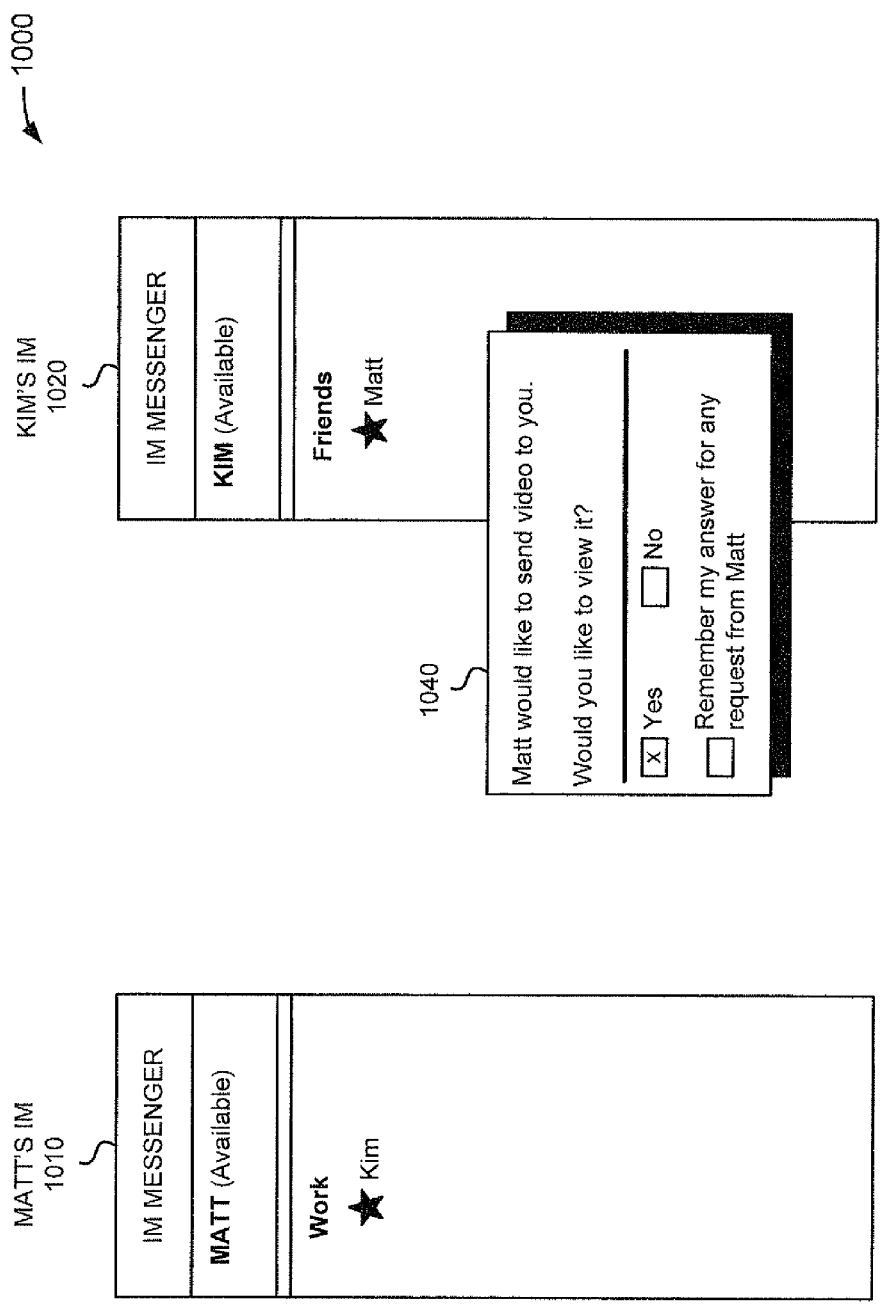

Matt's instant messenger 1010 may send a message 1030 to Kim's instant messenger 1020 indicating Matt's desire to send video to Kim, as illustrated in FIG. 10B. Upon receipt of message 1030, Kim's instant messenger 1020 may cause a popup window, such as popup window 1040, to be presented to Kim, as illustrated in FIG. 10C. Popup window 1040 may allow Kim to indicate whether or not she wishes to view the video. Assume that Kim indicates that she wishes to view the video, as illustrated in FIG. 10C.

Figure 10D:
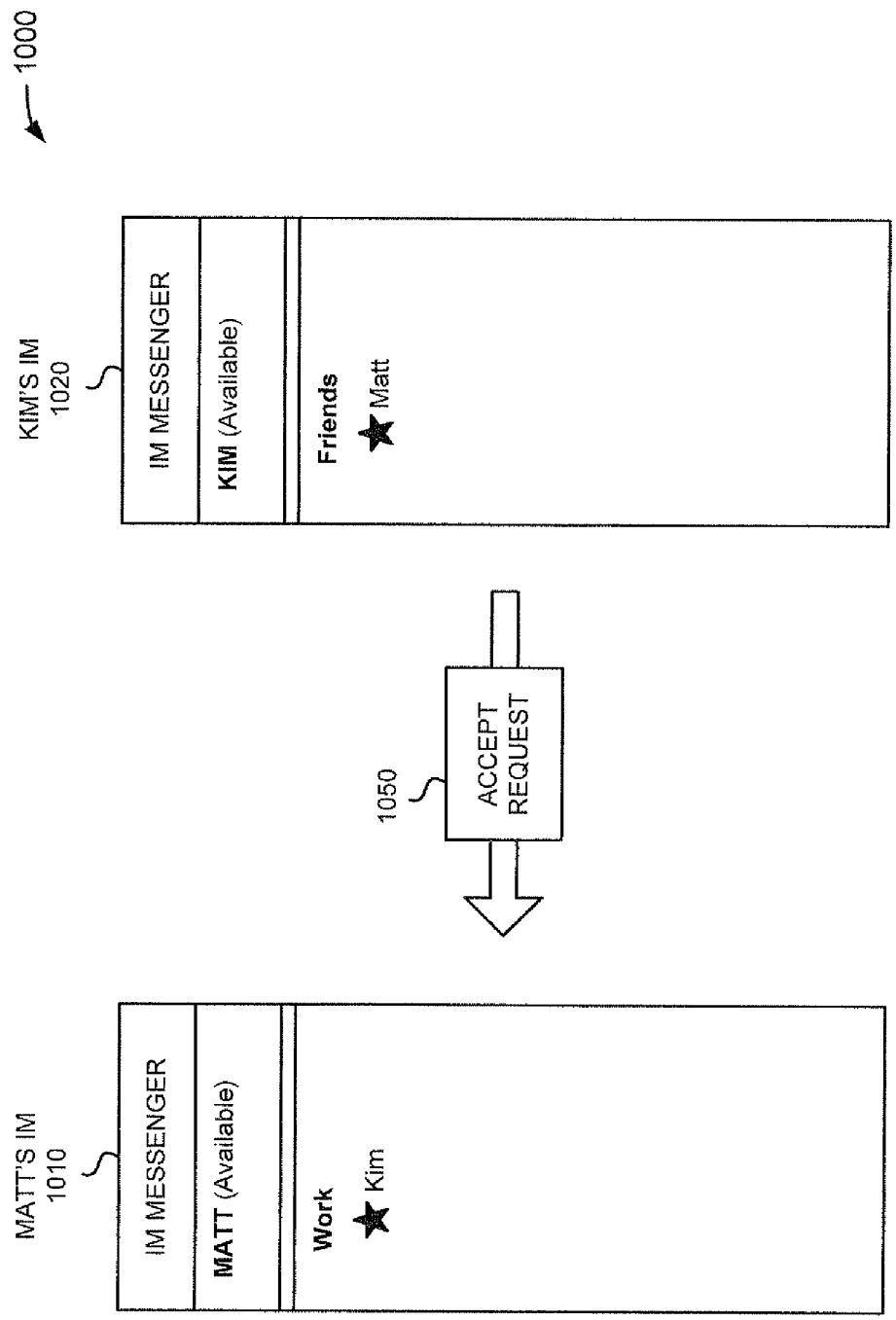
Figure 10E:
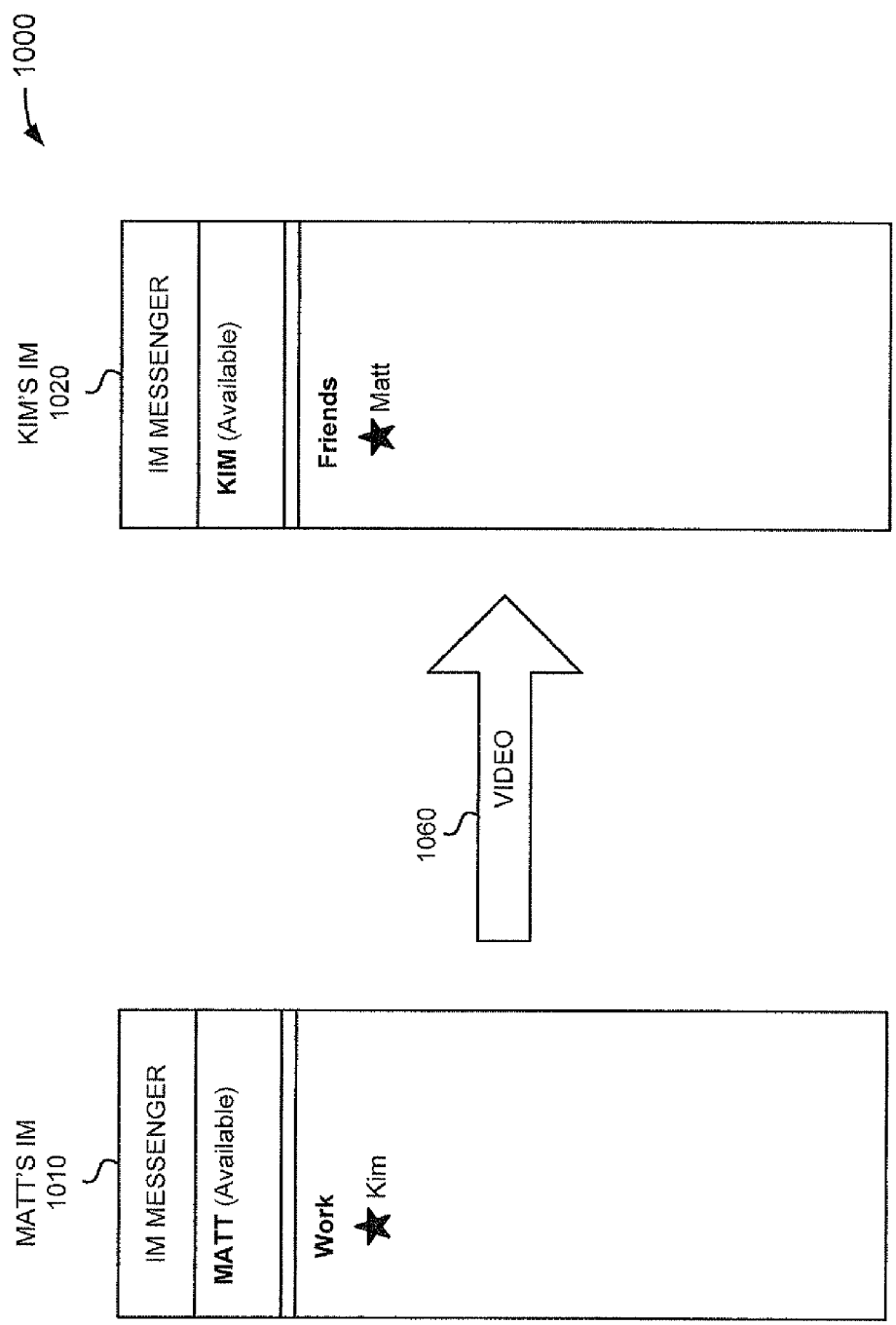

Kim's instant messenger 1020 may send a message 1050 to Matt's instant messenger 1010 indicating that Kim has accepted Matt's video request, as illustrated in FIG. 10D. Upon receipt of message 1050, the network device on which Matt's instant messenger 1010 is running may begin capturing Matt's interaction with the drawing application. Matt's instant messenger 1010 may then stream the captured video 1060 to Kim's instant messenger 1020, as illustrated in FIG. 10E. The streaming may be in a peer-to-peer manner (i.e., Matt's instant messenger 1010 may stream captured video 1060 directly to Kim's instant messenger 1020) or, as will be described in further detail below, through a server, such as server 220 (i.e., Matt's instant messenger 1010 may stream captured video 1060 to server 220, which may stream captured video 1060 to Kim's instant messenger 1020). In this way, Matt can allow Kim to view in substantially real time Matt's interaction with the drawing application. If Matt were experiencing trouble with the drawing application, Kim could, for example, view Matt's interaction for troubleshooting purposes.

Figure 11:
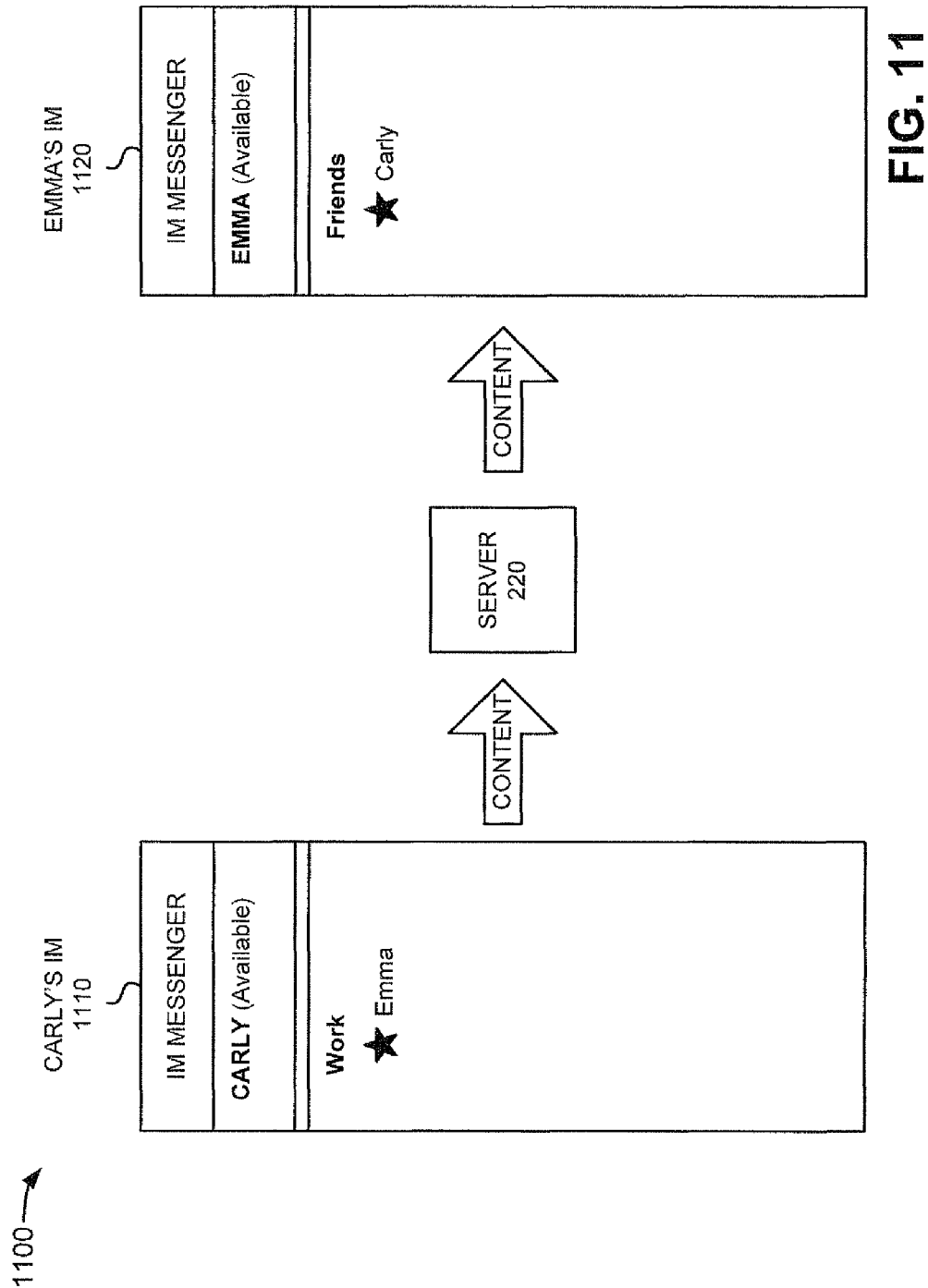

In the fifth example 1100, assume Carly and Emma are running instant messengers 1110 and 1120, respectively, as illustrated in FIG. 11. Moreover, assume Carly is streaming content (e.g., audio, video, dynamic graphics, or the like) from instant messenger 1110 to Emma's instant messenger 1120 and that the content is streamed through a server 220 instead of in a peer-to-peer manner.

Routing the streaming content through server 220 may allow for various processing to be performed on the content prior to delivery to the destination device (Emma's instant messenger 1120 in this example). For example, server 220 may determine whether Carly is authorized to stream the content to Emma prior to streaming the content to Emma. Server 220 could also add extra information to streaming content. For example, if the content is a song, server 220 may be configured to add lyrics to streaming content. Server 220 may also or alternatively remove the vocals from streaming music (leaving only the instrumentals), for example, for karaoke purposes. Other audio effects could alternatively be performed. For example, a streaming song could be combined with one or more other songs and the resulting song streamed to the destination device. Server 220 could perform processing on a set of input streams from a group of device and deliver one or more processed streams to one or more destination devices. For example, server 220 could compare the input streams, overlay the input streams, compose the input streams (e.g., combine the vocals from one of the input streams, the orchestra from another input stream, and the graphical animation from a third input stream), etc. Server 220 could also provide translation services. For example, if the content includes spoken text (e.g., a talk show broadcast) in a first language, server 220 could translate the spoken text from the first language to a second language prior to streaming the content to the destination device.

In other implementations consistent with principles of the invention, some or all of the above processing may be performed by the originating client or destination client. For example, the originating or destination client can transform the content in some manner, such as, for example, by child-proofing the content (e.g., removing offensive language), adding closed-captioning, turning color video to black-and-white, etc.

Conclusion

Systems and methods consistent with the principles of the invention allow users to stream content between network devices.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, it will be appreciated that a client may push content to another client or a client may request content from another client in situations where one client knows the identity of the audio/video being played on the other client and when the one client does not know the identity of the audio/video being played on the other client.

While series of acts have been described with regard to FIGS. 5 and 6, the order of the acts may be modified in other implementations consistent with the principles of the invention. Further, non-dependent acts may be performed in parallel.

The preceding description refers to a user. A "user" is intended to refer to a client, such as a client 210 (FIG. 2), or an operator of a client.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising: receiving, at a first network device, from a second network device, a request to share media content that is currently playing on the first network device with the second network device; responsive to receiving the request, determining whether the request to share media content that is currently playing on the first network device is accepted; responsive to determining the request to share media content that is currently playing on the first network device is accepted, capturing, by the first network device, data representing the media content that is currently playing on the first network device responsive to the data leaving a media processor of the first network device; reformatting, by the first network device, the captured data representing the media content as streaming data representing the media content; and transmitting the streaming data from the first network device to a server device to enable synchronized playback of the media content at the second network device, wherein the server device alters the media content represented by the streaming data before sending data representing the altered media content to the second network device, the altering of the media content comprising removing vocal audio in a first language from the media content, and adding vocal audio in a second language to the media content before transmitting the altered media content from the server device to the second network device, wherein the altered media content is intended to be played by the second network device such that the vocal audio in the second language is output without outputting vocal audio in the first language.

2. The method of claim 1, wherein the reformatting of the media content as the streaming data comprises encoding the media content to a predetermined format.

3. The method of claim 1, wherein the request is received from a desktop application at the second network device.

4. The method of claim 1, wherein the media content includes video of a user interface for an application running at the first network device.

5. The method of claim 1, further comprising providing an indication of media content currently playing on the first network device to the second network device, including a title associated with the media content.

6. The method of claim 1, further comprising transmitting geographical location information associated with the first network device to the server device with an indication of the media content currently playing on the first network device.

7. The method of claim 1, wherein the altered media content is transmitted with a description associated with the media content.

8. The method of claim 1, wherein the information relating to the altered media content is transmitted with an advertisement relating to the media content.

9. The method of claim 1, wherein the altering of the media content includes translating the media content from a first language to a second language.

10. The method of claim 1, wherein the altering of the media content includes removing vocals from a song in the media content.

11. The method of claim 1, wherein the altering of the media content includes combining a song in the media content with at least one other song.

12. The method of claim 1, wherein the media content includes a song, and lyrics for the song are provided to the second network device.

13. The method of claim 1, wherein the modifying altering of the media content includes at least one of child-proofing the content, and converting the media content from a first color to a second color.

14. The method of claim 1, wherein the media content includes audio, and the capturing includes recording audio data responsive to the audio data leaving an audio processor associated with the first network device.

15. The method of claim 1, wherein the media content includes video, and the capturing includes recording video data responsive to the video data leaving a graphics processing unit associated with the first network device.

16. The method of claim 1, wherein the media content includes video of a user interface for an application running at the first network device.

17. The method of claim 1, wherein the altering of the media content includes extracting at least audio or visual track from the media content, and overlaying the extracted at least one audio or visual track with at least one other audio or visual track in streaming data transmitted from a third network device.

18. A method comprising: sending, from a first network device, to a second network device, a request to share media content that is currently playing on the first network device with the second network device; responsive to receiving, at the first network device, an indication of approval of the request from the second network device, capturing, by the first network device, data representing the media content that is currently playing on the first network device responsive to the data leaving a media processor of the first network device; reformatting, by the first network device, the captured data representing the media content as streaming data representing the media content; and transmitting the streaming data, from the first network device to a server device to enable synchronized playback of the media content at the second network device, wherein the server device alters the media content represented by the streaming data before sending data representing the altered media content to the second network device, the altering of the media content comprising adding lyric video content to the media content and removing vocal audio content from the media content before transmitting the altered media content from the server device to the second network device, wherein the altered media content is intended to be played by the second network device such that the lyric video is output without outputting vocal audio.

19. The method of claim 18, wherein reformatting of the media content as the streaming data comprises encoding the media content to a predetermined format.

20. The method of claim 18, wherein the request is sent to a desktop application.

21. The method of claim 20, wherein the altered media content is streamed to a desktop application.

22. The method of claim 18, wherein the media content includes audio, and the capturing includes recording audio data responsive to the audio data leaving an audio processor associated with the first network device.

23. The method of claim 18, wherein the media content includes video, and the capturing includes recording video data responsive to the video data leaving a graphics processing unit associated with the first network device.

24. The method of claim 18, wherein the information includes a title associated with the media content and at least one of a time that the media content began playing on the first network device and a geographical location associated with the first network device.

25. The method of claim 18, wherein the altered media content is transmitted with a description of the media content.

26. The method of claim 18, wherein the altered media content is transmitted with an advertisement relating to the media content.

27. The method of claim 18, wherein the altering of the media content includes at least one of child-proofing the content, and converting the media content from a first color to a second color.

28. The method of claim 18, wherein the altering of the media content includes translating the media content from a first language to a second language.

29. The method of claim 18, wherein the altering of the media content includes removing vocals from a song in the media content.

30. The method of claim 18, wherein the altering of the media content includes combining a song in the media content with at least one other song.

31. The method of claim 18, wherein the media content includes a song, and lyrics for the song are provided to the second network device.

32. The method of claim 18, wherein the altering of the media content includes extracting at least audio or visual track from the media content, and overlaying the extracted at least one audio or visual track with at least one other audio or visual track in streaming data transmitted from a third network device.

* * * * *